(12) United States Patent
Min

(10) Patent No.: US 12,105,348 B2
(45) Date of Patent: Oct. 1, 2024

(54) LENS DRIVING DEVICE AND CAMERA DEVICE

(71) Applicant: LG INNOTEK CO., LTD., Seoul (KR)

(72) Inventor: Sang Jun Min, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 827 days.

(21) Appl. No.: 17/268,895

(22) PCT Filed: Sep. 5, 2019

(86) PCT No.: PCT/KR2019/011493
§ 371 (c)(1),
(2) Date: Feb. 16, 2021

(87) PCT Pub. No.: WO2020/050654
PCT Pub. Date: Mar. 12, 2020

(65) Prior Publication Data
US 2021/0325628 A1 Oct. 21, 2021

(30) Foreign Application Priority Data
Sep. 5, 2018 (KR) .......................... 10-2018-0105939

(51) Int. Cl.
*G02B 7/09* (2021.01)
*G03B 3/10* (2021.01)
*G03B 5/04* (2021.01)

(52) U.S. Cl.
CPC ................. *G02B 7/09* (2013.01); *G03B 3/10* (2013.01); *G03B 5/04* (2013.01); *G03B 2205/0015* (2013.01); *G03B 2205/0069* (2013.01)

(58) Field of Classification Search
CPC .......... G02B 7/09; G02B 7/08; G02B 27/646; G02B 7/023; G03B 3/10; G03B 5/04;
(Continued)

(56) References Cited

U.S. PATENT DOCUMENTS

| | | | |
|---|---|---|---|
| 2015/0103195 A1* | 4/2015 | Kwon | H04N 23/54 |
| | | | 348/208.12 |
| 2018/0031854 A1 | 2/2018 | Hu et al. | |
| 2019/0170967 A1* | 6/2019 | Jung | G02B 7/105 |

FOREIGN PATENT DOCUMENTS

| | | |
|---|---|---|
| CN | 104216199 A | 12/2014 |
| CN | 106094153 A | 11/2016 |

(Continued)

OTHER PUBLICATIONS

International Search Report dated Dec. 12, 2019 in International Application No. PCT/KR2019/011493.

(Continued)

*Primary Examiner* — Mustak Choudhury
*Assistant Examiner* — K Muhammad
(74) *Attorney, Agent, or Firm* — Saliwanchik, Lloyd & Eisenschenk

(57) ABSTRACT

The present embodiment relates to a lens driving device comprising: a housing; a bobbin; a first coil; a magnet; a base; a first substrate; a second substrate; and a conductive member, wherein the first substrate comprises a first groove and a first terminal which is adjacent to the first groove, the second substrate comprises a second terminal, the conductive member connects the first terminal of the first substrate to the second terminal of the second substrate, a body unit of the first substrate comprises a first side surface, a second side surface, a third side surface, and a fourth side surface, an extension portion of the first substrate is formed at the third side surface and the fourth side surface, the first terminal of the first substrate comprises four terminals, two of which are adjacent to the first side surface and the other two of which are adjacent to the second side surface.

20 Claims, 11 Drawing Sheets

(58) Field of Classification Search
CPC .... G03B 2205/0015; G03B 2205/0069; G03B 2205/0007; G03B 30/00; G03B 5/00; G03B 17/12; H04N 23/55
See application file for complete search history.

(56) References Cited

FOREIGN PATENT DOCUMENTS

| | | | | |
|---|---|---|---|---|
| CN | 106687846 A | 5/2017 | | |
| CN | 107277307 A | 10/2017 | | |
| CN | 107407788 A | 11/2017 | | |
| CN | 107561825 A | 1/2018 | | |
| CN | 107664895 A | 2/2018 | | |
| CN | 107664897 A | 2/2018 | | |
| CN | 207424352 U | 5/2018 | | |
| CN | 108415140 A | 8/2018 | | |
| JP | 2017-194679 A | 10/2017 | | |
| JP | 2018-77390 A | 5/2018 | | |
| KR | 10-2014-0118577 A | 10/2014 | | |
| KR | 20140118577 A | * 10/2014 | ............... | G02B 7/08 |
| KR | 10-2016-0008860 A | 1/2016 | | |
| KR | 20160008860 A | * 1/2016 | ............... | G02B 7/08 |
| KR | 10-2017-0032242 A | 3/2017 | | |
| KR | 20170032242 A | * 3/2017 | ........... | G02B 27/646 |
| KR | 20170082803 A | * 7/2017 | | |
| KR | 10-2017-0126581 A | 11/2017 | | |
| KR | 20170126581 A | * 11/2017 | ............. | G02B 7/021 |
| KR | 10-2018-0010472 A | 1/2018 | | |
| KR | 10-2018-0013772 A | 2/2018 | | |
| KR | 10-2018-0098076 A | 9/2018 | | |
| WO | WO-2017196045 A1 | * 11/2017 | ............. | G01B 11/30 |
| WO | 2018/123815 A1 | 7/2018 | | |

OTHER PUBLICATIONS

Office Action dated Mar. 25, 2022 in Chinese Application No. 201980057561.6.
Supplementary European Search Report dated Apr. 22, 2022 in European Application No. 19858227.2.
Office Action dated Mar. 17, 2023 in Korean Application No. 10-2018-0105939.

* cited by examiner

LENS DRIVING DEVICE AND CAMERA DEVICE

CROSS-REFERENCE TO RELATED APPLICATIONS

This application is the U.S. national stage application of International Patent Application No. PCT/KR2019/011493, filed Sep. 5, 2019, which claims the benefit under 35 U.S.C. § 119 of Korean Application No. 10-2018-0105939, filed Sep. 5, 2018, the disclosures of each of which are incorporated herein by reference in their entirety.

TECHNICAL FIELD

The present embodiment relates to a lens driving device and a camera device.

BACKGROUND ART

The content described below provides background information for the present embodiment, but does not describe the prior art.

As the spread of various smartphones is widely generalized and wireless Internet services are commercialized, the demands of consumers related to the smartphones are also diversified, and various types of additional devices are mounted on the smartphones.

Among them, there is a camera deice for photographing a subject as a photograph or a moving picture. In recent camera devices, an image stabilization function that inhibits an image from shaking caused by the hand shaking of a photographer has been applied.

In a conventional actuator for image stabilization, a connection terminal connecting an OIS driving coil and a FPCB is located around an inner side through hole.

In this case, when foreign substances such as flux and solder balls occur due to the soldering process of the connection terminal of the FPCB and the OIS driving coil, there is a problem that the distance to the image sensor is short and thus it is vulnerable to the foreign substances.

In addition, the inner side through hole is used as an assembly guide for the FPCB and a base, and there is a problem that mechanical interferences with the shape of the base guide are likely to occur due to the height and size of the lead generated in a soldering portion. Due to this, there is a problem that is also vulnerable to a concentricity failure and also a lifting failure.

DETAILED DESCRIPTION OF THE INVENTION

Technical Subject

The present embodiment is intended to provide a lens driving device that minimizes the influence of foreign substances such as lead and flux generated in a soldering portion of the connection terminal connecting the FPCB and the OIS driving coil.

In addition, it is intended to provide a lens driving device in which there is no mechanical interference when OIS is driven by arranging the soldering portion on the opposite side of the surface facing a magnet.

In addition, it is intended to provide a lens driving device that inhibits lifting by adding a soldering portion escape shape to the corresponding surface of the base.

Furthermore, it is intended to provide a camera device comprising the lens driving device.

Technical Solution

A lens driving device according to the present embodiment comprises: a housing; a bobbin disposed in the housing; a first coil disposed on the bobbin; a magnet disposed in the housing and facing the first coil; a base disposed under the housing; a first substrate disposed on the base; a second substrate comprising a second coil facing the magnet and disposed on the first substrate; and a conductive member electrically connecting the first substrate and the second substrate, wherein the first substrate comprises a body portion disposed on an upper surface of the base, an extension portion bent and extending from the body portion, a first groove formed on an outer circumference of the body portion, and a first terminal formed on a lower surface of the first substrate and adjacent to the first groove, wherein the second substrate comprises a second terminal formed on a lower surface of the second substrate and disposed at a position corresponding to the first terminal of the first substrate, wherein the conductive member connects the first terminal of the first substrate and the second terminal of the second substrate, wherein the body portion of the first substrate comprises a first lateral surface, a second lateral surface disposed opposite the first lateral surface, and a third lateral surface and a fourth lateral surface disposed opposite to each other between the first lateral surface and the second lateral surface, wherein the extension portion of the first substrate is formed on the third lateral surface and the fourth lateral surface, and wherein the first terminal of the first substrate comprises four terminals, two of the four terminals are disposed adjacent to the first lateral surface, and the other two terminals may be disposed adjacent to the second lateral surface.

The base may comprise a second groove formed on an upper surface of the base and formed at a position corresponding to the first terminal.

The first terminal of the first substrate and the second terminal of the second substrate are coupled through soldering, and at least a portion of the solder may be disposed in the second groove of the base.

The bobbin comprises a hole formed in the bobbin in the optical axis direction, the base comprises a first hole formed in the base in a position corresponding to the hole in the bobbin in the optical axis direction, and the second groove of the base may be disposed closer to the outer circumference of the base than the first hole of the base.

The first groove of the first substrate may comprise: a first-first groove and a first-second groove formed by being recessed from the first lateral surface of the body portion of the first substrate and are spaced apart from each other; and a first-third groove and a first-fourth groove formed by being recessed from the second lateral surface of the body portion of the first substrate and spaced apart from each other.

The four terminals of the first terminal of the first substrate comprises a first-first terminal extending from the first-first groove, a first-second terminal extending from the first-second groove, a first-third terminal extending from the first-third groove, and a first-fourth terminal extending from the first-fourth groove, wherein the first-first terminal extends from the first-first groove toward the first-second groove, the first-second terminal extends from the first-second groove toward the first-first groove, the first-third terminal extends from the first-third groove toward the first-fourth groove, and the first-fourth terminal extends from the first-fourth groove toward the first-third groove.

The lens driving device may comprise: an upper elastic member coupled to an upper portion of the bobbin and an upper portion of the housing; and a support member coupled to the upper elastic member and the body portion of the first substrate.

The first terminal of the first substrate extends along a lower surface of the first substrate, the first substrate comprises a third terminal formed on the lower surface of the first substrate and coupled to the support member, the support member comprises four wires, the third terminal of the first substrate comprises third-first terminal to third-fourth terminal respectively coupled to the four wires, the third-first terminal and the third-second terminal are disposed closer to the first lateral surface than the second lateral surface of the first substrate, and the first-first terminal and the first-second terminal may be disposed between the third-first terminal and the third-second terminal.

The lens driving device further comprises a cover made of a metal material comprising an upper plate disposed on the bobbin and a lateral plate extending from the upper plate and coupled to the base, the lateral surface of the base comprises a fifth lateral surface, a sixth lateral surface disposed opposite to the fifth lateral surface, and a seventh lateral surface and an eighth lateral surface disposed opposite to each other between the fifth and sixth lateral surfaces, the base comprises a third groove formed on each of the fifth lateral surface and the sixth lateral surface, and a fourth groove formed on each of the seventh and eighth lateral surfaces, the extension portion of the first substrate is disposed in the fourth groove of the base, the first substrate comprises a bent portion extending from each of the first lateral surface and the second lateral surface of the first substrate and disposed in the third groove of the base, and a fourth terminal disposed on the outer surface of the bent portion, and the fourth terminal of the first substrate may be in contact with an inner surface of the lateral plate of the cover.

The lens driving device further comprises a Hall sensor disposed on a lower surface of the first substrate, and base comprises a second hole spaced apart from the second groove, and the Hall sensor may be disposed in the second hole of the base.

The base comprises a protruding portion protruded from the upper surface of the base portion extending along the inner circumferential surface of the first hole of the base, and a protrusion protruding outward from the protruding portion, each of the first substrate and the second substrate may comprise a third hole corresponding to the protruding portion of the base, and a fifth groove formed in a shape corresponding to the protrusion at a position corresponding to the protrusion on the inner circumferential surface of the third hole.

A lens driving device according to the present embodiment comprises: a printed circuit board; an image sensor disposed on the printed circuit board; a housing disposed on the printed circuit board; a bobbin disposed in the housing; a lens coupled to the bobbin and disposed at a position corresponding to the image sensor; a first coil disposed on the bobbin; a magnet disposed in the housing and facing the first coil; a base disposed between the printed circuit board and the housing; a first substrate comprising a body portion disposed on an upper surface of the base, and an extension portion extending from the body portion and disposed on a lateral surface of the base; a second substrate comprising a second coil facing the magnet and disposed on an upper surface of the body portion of the first substrate; an upper elastic member coupled to an upper portion of the bobbin and an upper portion of the housing; and a support member coupled to the upper elastic member and the body portion of the first substrate, wherein the second substrate comprises a second terminal disposed on a lower surface of the second substrate, the first substrate comprises a first groove formed on an outer surface of the body portion of the first substrate and disposed at a position corresponding to the second terminal of the second substrate, and a first terminal extending from the first groove along the lower surface of the first substrate, the first terminal of the first substrate and the second terminal of the second substrate are connected through a conductive member, the base comprises a second groove formed on the upper surface of the base, and at least a portion of the conductive member may be disposed in the second groove of the base.

Advantageous Effects

Through this embodiment, it is possible to minimize the influence of foreign substances such as lead and flux generated in the soldering portion of the connection terminal connecting the FPCB and the OIS driving coil.

In addition, mechanical interference can be inhibited when OIS is driven by arranging the soldering portion on the opposite side of the surface facing magnet.

In addition, by adding a soldering portion escape shape to the corresponding surface of the base, it is possible to inhibit the FPCB and OIS drive coil from being lifted.

In addition, since there is no solder terminal (first terminal) on the side of the extension portion where the terminals are disposed on the first substrate, the soldering workability between the substrates of the lens driving device and the camera module can be ensured by increasing the width or pitch of the extension portion even if the number of terminals disposed on the extension portion increases.

BEST MODE

Figure 1:
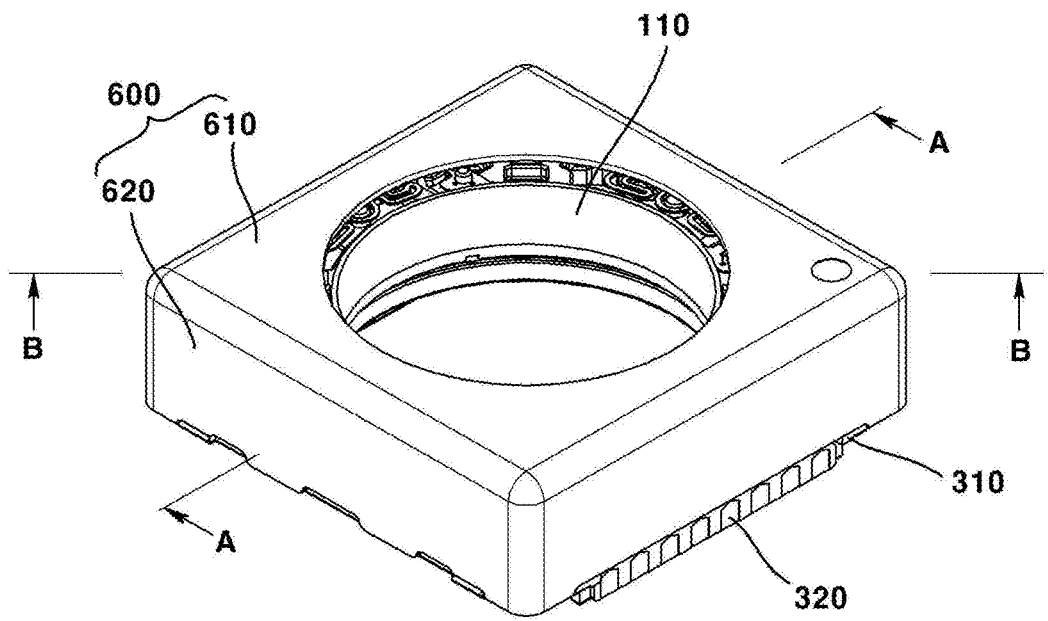
FIG. 1 is a perspective view of a lens driving device according to the present embodiment.

Hereinafter, preferred embodiments of the present invention will be described in detail with reference to the accompanying drawings.

However, the technical idea of the present invention is not limited to some embodiments to be described, but may be implemented in various forms, and if it is within the scope of the technical idea of the present invention, one or more of the components may be selected, combined, and substituted between the embodiments for use.

In addition, terms (comprising technical and scientific terms) used in the embodiments of the present invention are generally understood by those of ordinary skill in the technical field to which the present invention belongs unless explicitly defined and described, and it can be interpreted as a meaning, and terms generally used, such as terms defined in a dictionary, may be interpreted in consideration of the meaning in the context of the related technology.

In addition, terms used in the embodiments of the present invention are for describing the embodiments and are not intended to limit the present invention.

In the present specification, the singular form may comprise the plural form unless specifically stated in the phrase, and when described as "at least one (or more than one) of A and B and C", it may contain one or more of all combinations that can be combined with A, B, and C.

In addition, terms such as first, second, A, B, (a), (b), and the like may be used in describing the components of the embodiment of the present invention. These terms are only for distinguishing the component from other components, and are not limited to the nature, order, or order of the component by the term.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when it is described as being formed or disposed in the "top (upper side) or bottom (lower side)" of each component, the top (upper side) or bottom (lower side) not only comprises a case when the two components are in direct contact with each other but also comprises a case where one or more other components are formed or disposed between the two components. In addition, when expressed as "top (upper side) or bottom (lower side)", the meaning of not only an upward direction but also a downward direction based on one component may be comprised.

The 'optical axis direction' used below is defined as the optical axis direction of the lens coupled to the holder. Meanwhile, the 'optical axis direction' may correspond to an 'up-down direction', a 'z-axis direction', and the like.

The "auto focus function" used below is defined as the function that automatically focuses on a subject by moving the lens in the direction of the optical axis according to the distance of the subject so that clear images of the subject can be obtained on the image sensor. Meanwhile, 'auto focus' can be used interchangeably with 'Auto Focus (AF)'.

The 'image stabilization function' used below is defined as a function of moving or tilting a lens module in a direction perpendicular to the optical axis direction so as to cancel a vibration (movement) generated in an image sensor by an external force. Meanwhile, "image stabilization" may be used interchangeably with "optical image stabilization (OIS)".

Hereinafter, a configuration of an optical device according to the present embodiment will be described with reference to the drawings.

The optical apparatus may be any one of a mobile phone, a mobile phone, a smart phone, a portable smart device, a digital camera, a laptop computer, a digital broadcasting terminal, a personal digital assistant (PDA), a portable multimedia player (PMP), and a navigation device. However, the type of the optical apparatus is not limited thereto, and any device for capturing an image or a picture may be comprised in the optical apparatus.

The optical apparatus may comprise a main body. The main body may form the appearance of the optical apparatus. The main body may accommodate a camera device. A display unit may be disposed on one surface of the main body. For example, the display unit and the camera device may be disposed on one surface of the main body, and another camera device may be additionally disposed on the other surface (a surface opposite to the one surface) of the main body.

The optical apparatus may comprise a display unit. The display unit may be disposed on one surface of the main body. The display unit may output an image photographed by the camera device.

The optical apparatus may comprise a camera device. The camera device may be disposed in the main body. At least a portion of the camera device may be accommodated in the main body. The camera device may be provided in plurality. The camera device may be disposed respectively on one surface of the main body and the other surface of the main body. The camera device may photograph an image of a subject.

Hereinafter, the configuration of the camera device according to the present embodiment will be described.

The camera device may comprise a lens module. The lens module may comprise at least one lens. The lens module may comprise a barrel and a plurality of lenses coupled to the in of the barrel. The lens module may be coupled to a bobbin 110 of the lens driving device. The lens module may be coupled to the bobbin 110 by screw-coupling and/or an adhesive. The lens module can move integrally with the bobbin 110.

The camera device may comprise a filter. The filter may comprise an infrared filter. The infrared filter may block light in the infrared region from entering the image sensor. The infrared filter may be disposed between the lens and the image sensor. For example, the infrared filter may be disposed on a sensor base disposed between the lens driving device and a printed circuit board. As another example, the infrared filter may be disposed on the base 430.

The camera device may comprise a printed circuit board. A lens driving device may be disposed on the printed circuit board. In this case, a sensor base may be disposed between the printed circuit board and the lens driving device. The printed circuit board may be electrically connected to the lens driving device. An image sensor may be disposed on the printed circuit board. The printed circuit board may be electrically connected to the image sensor.

The camera device may comprise an image sensor. The image sensor may be disposed on a printed circuit board. The image sensor may be electrically connected to the printed circuit board. For example, the image sensor may be coupled to a printed circuit board by surface mounting technology (SMT). As another example, the image sensor may be coupled to a printed circuit board by flip chip technology. The image sensor may be disposed so that the lens and the optical axis coincide. That is, the optical axis of the image sensor and the optical axis of the lens may be aligned. The image sensor may convert light irradiated to the effective image area of the image sensor into an electrical signal. The image sensor may be any one of a charge coupled device (CCD), a metal oxide semi-conductor (MOS), a CPD, and a CID.

The camera device may comprise a controller. The controller may be disposed on a printed circuit board. The controller may individually control the direction, intensity, and amplitude of the current supplied to a first coil 120 and a second coil 331 of the lens driving device. The controller may perform an auto focus function and/or an image stabilization function by controlling the lens driving device. Furthermore, the controller may perform auto focus feedback control and/or image stabilization feedback control for the lens driving device.

Hereinafter, the configuration of the lens driving device according to the present embodiment will be described with reference to the drawings.

Figure 2:
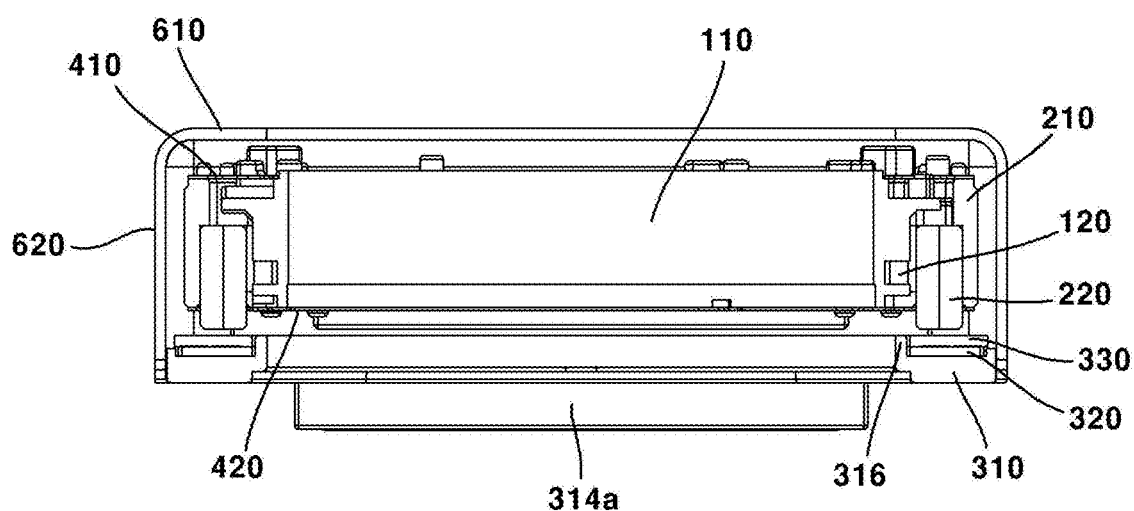
FIG. 2 is a cross-sectional view as viewed from A-A of FIG. 1.
Figure 3:
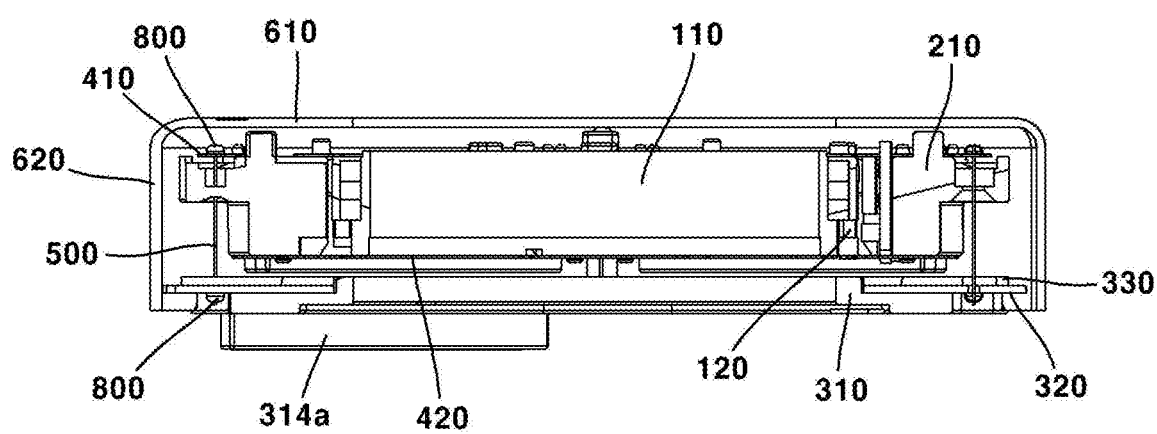
FIG. 3 is a cross-sectional view as viewed from B-B of FIG. 1.
Figure 4:
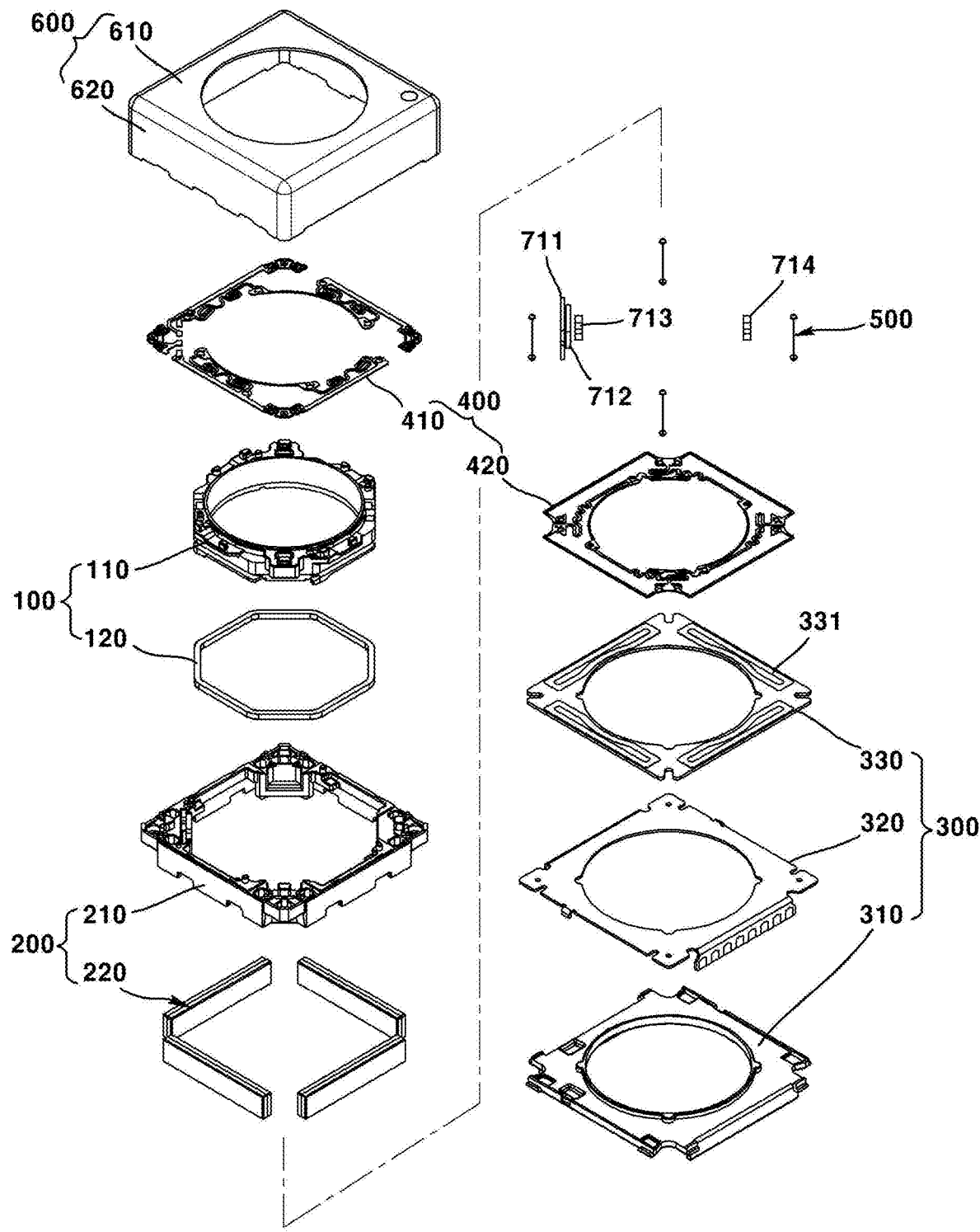
FIG. 4 is an exploded perspective view of a lens driving device according to the present embodiment.
Figure 5:
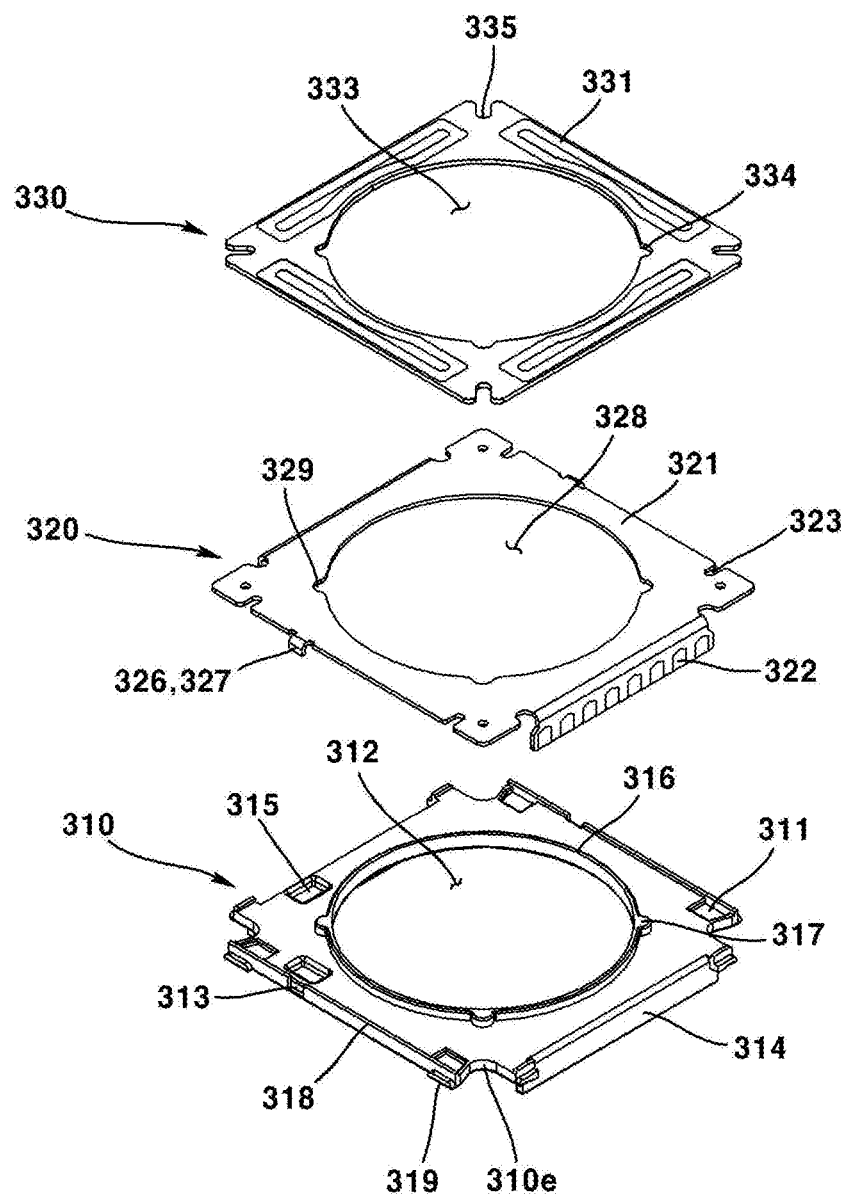
FIG. 5 is an exploded perspective view of some components of the lens driving device according to the present embodiment.
Figure 6:
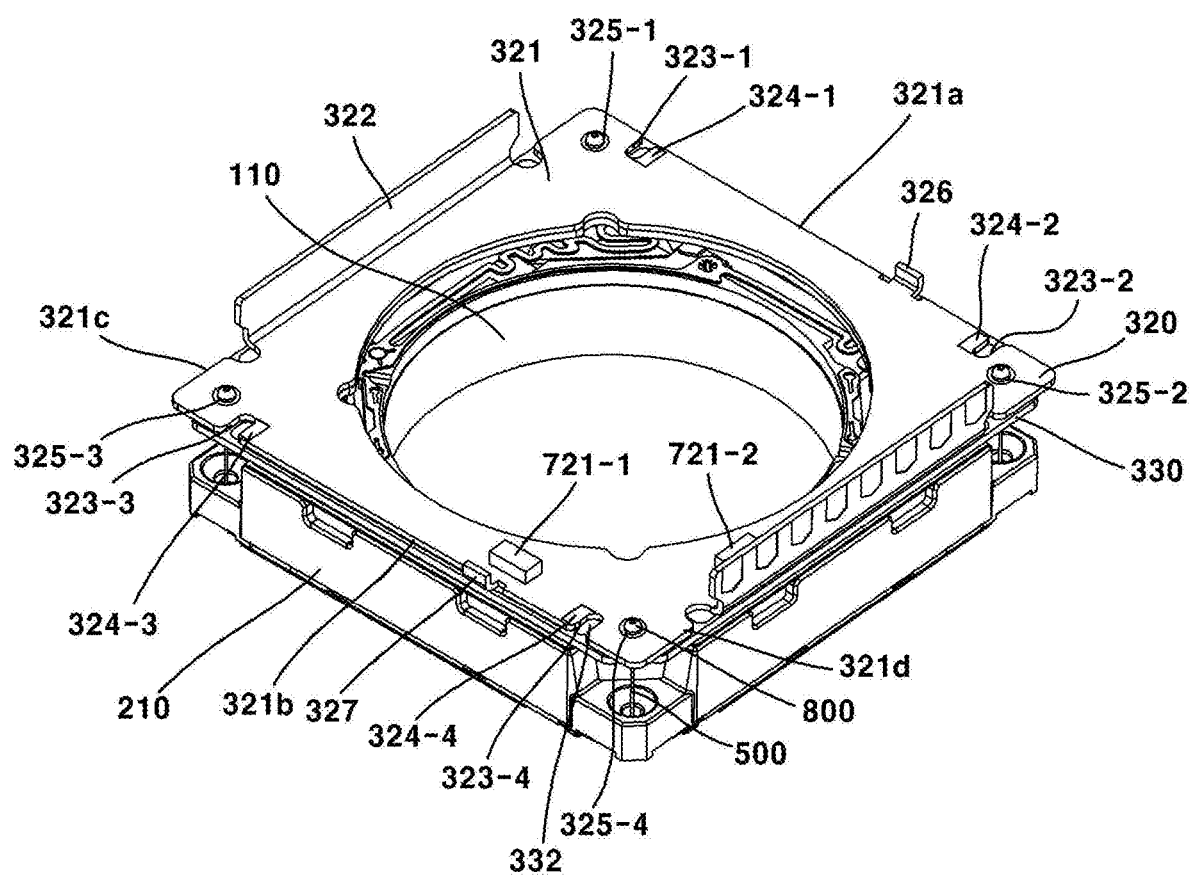
FIG. 6 is a bottom perspective view of some components of the lens driving device according to the present embodiment.
Figure 7:
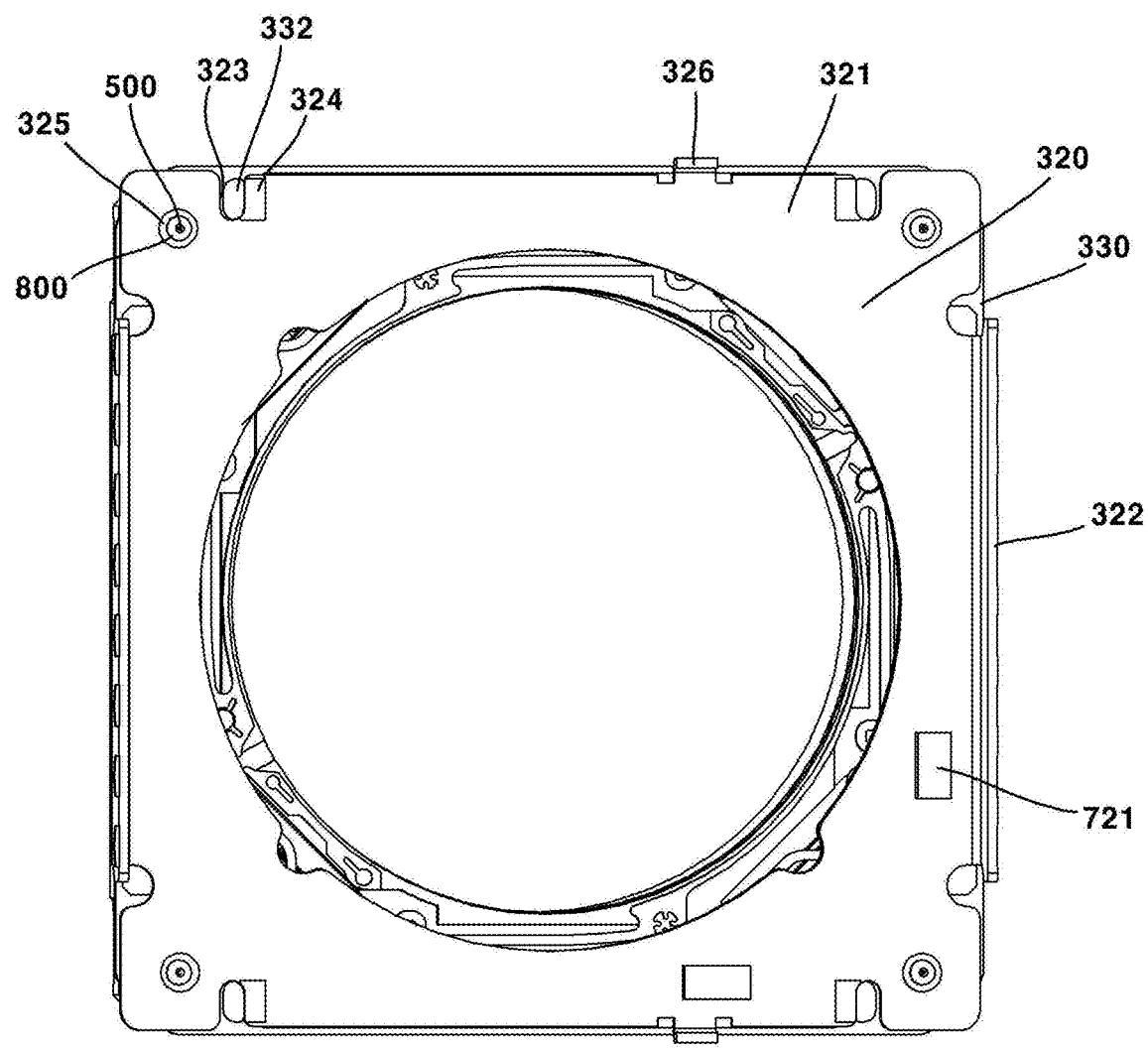
FIG. 7 is a bottom view of some components of the lens driving device according to the present embodiment.
Figure 8:
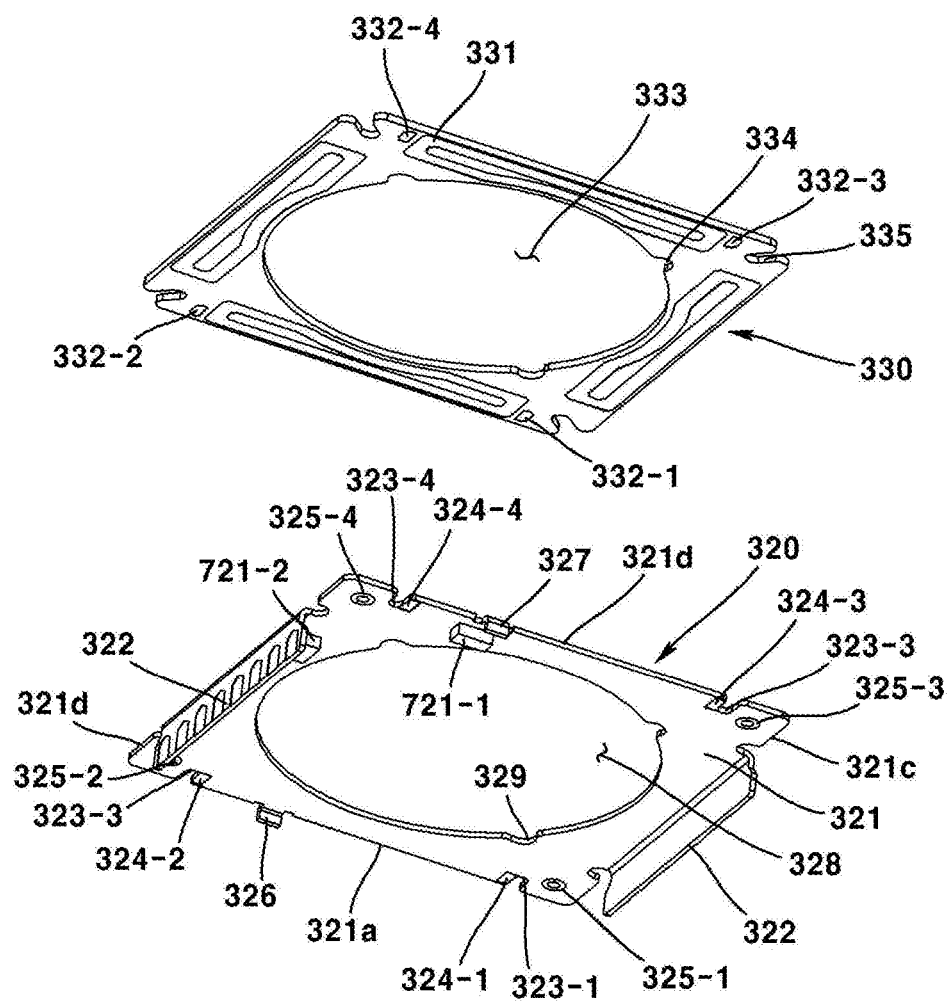
FIG. 8 is an exploded perspective view of the bottom of some components of the lens driving device according to the present embodiment.
Figure 9:
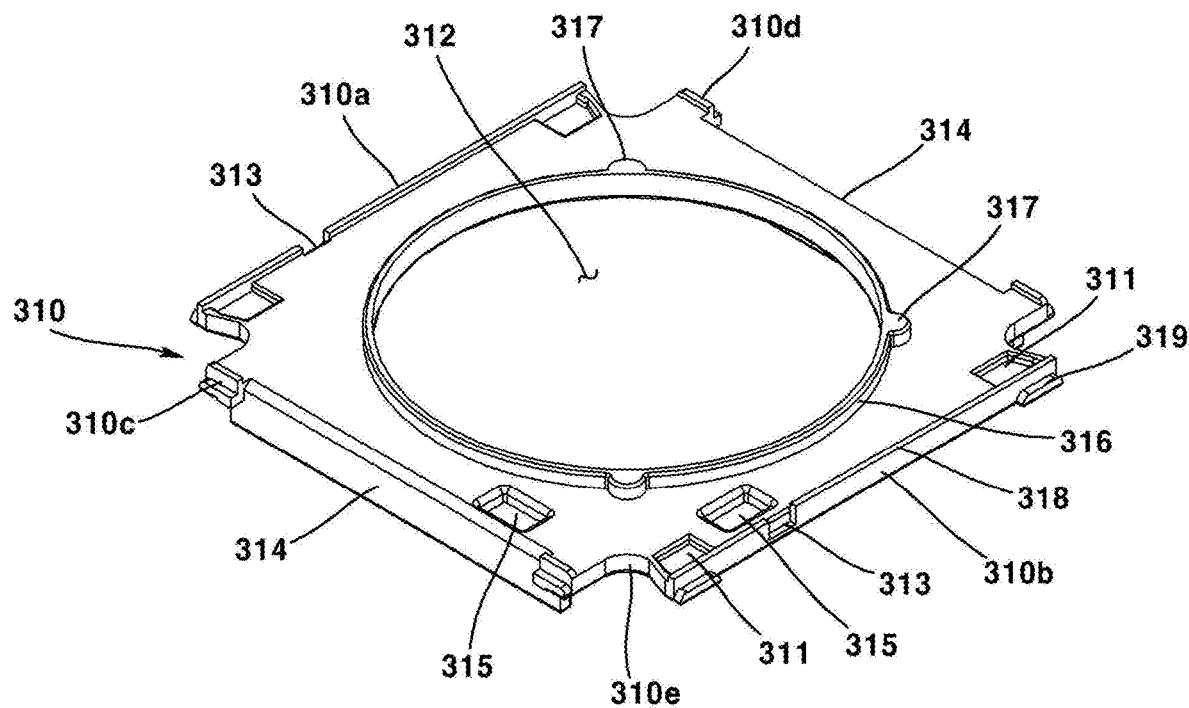
FIG. 9 is a perspective view of a base of a lens driving device according to this embodiment.
Figure 10:
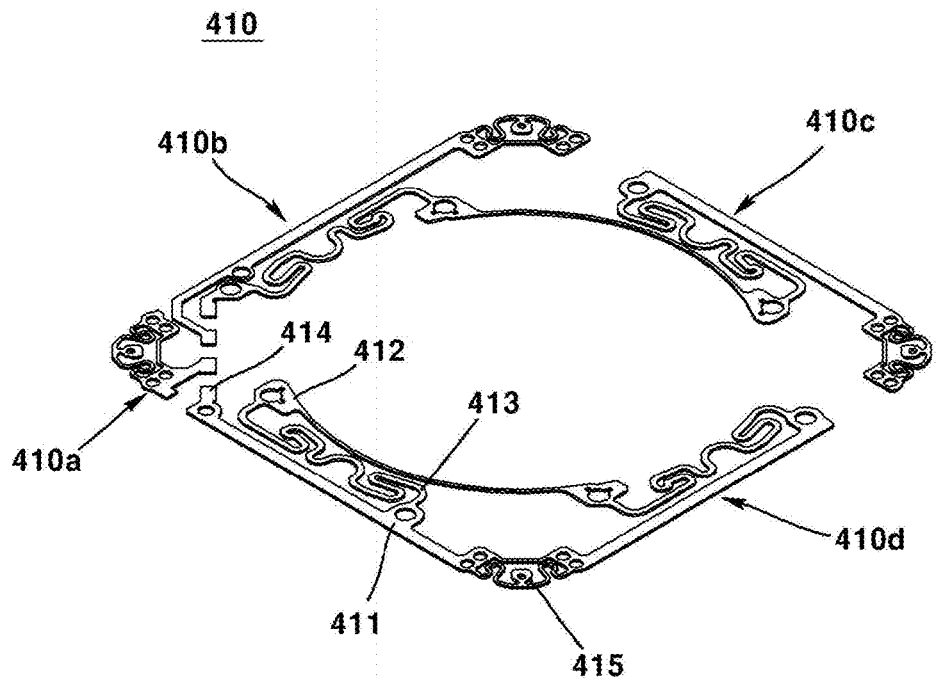
FIG. 10 is a perspective view of an upper elastic member of the lens driving device according to the present embodiment.
Figure 11:
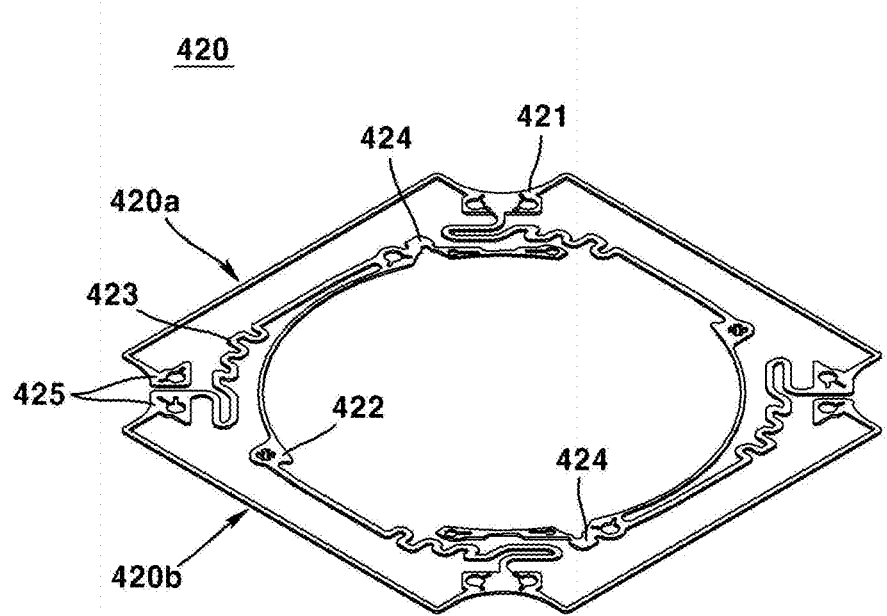
FIG. 11 is a perspective view of a lower elastic member of the lens driving device according to the present embodiment.

FIG. 1 is a perspective view of a lens driving device according to the present embodiment, FIG. 2 is a cross-sectional view viewed from A-A of FIG. 1, FIG. 3 is a cross-sectional view viewed from B-B of FIG. 1, FIG. 4 is an exploded perspective view a lens driving device according to the present embodiment, FIG. 5 is an exploded perspective view of some components of the lens driving device according to the present embodiment, FIG. 6 is a bottom perspective view of some components of the lens driving device according to this embodiment, FIG. 7 is a bottom view of some components of the lens driving device according to the present embodiment, FIG. 8 is an exploded perspective view of the bottom of some components of the lens driving device according to the present embodiment, FIG. 9 is a perspective view of a base of the lens driving device according to the present embodiment, FIG. 10 is a perspective view of an upper elastic member of the lens driving device according to the present embodiment, and FIG. 11 is a perspective view of a lower elastic member of the lens driving device according to the present embodiment.

The lens driving device may be a voice coil motor (VCM). The lens driving device may be a lens driving motor. The lens driving device may be a lens driving actuator. The lens driving device may comprise an AF module. The lens driving device may comprise an OIS module. The lens driving device according to the present exemplary embodiment may comprise an outer arrangement structure of the soldering terminal unit.

The lens driving device may comprise a first mover 100. The first mover 100 may be coupled to a lens. The first mover 100 may be coupled to the second mover 200 through an elastic member 400. The first mover 100 may move through an interaction with the second mover 200. At this time, the first mover 100 may move integrally with the lens. Meanwhile, the first mover 100 may move during AF driving. At this time, the first mover 100 may be referred to as an 'AF mover'. However, the first mover 100 may move together with the second mover 200 even during OIS driving.

The lens driving device may comprise a bobbin 110. The bobbin 110 may be disposed in the housing 210. The bobbin 110 may be disposed in a hole of the housing 210. The bobbin 110 may be movably coupled to the housing 210. The bobbin 110 may move in the optical axis direction with respect to the housing 210. A lens may be coupled to the bobbin 110. The bobbin 110 may comprise a hole formed in the bobbin 110 in the optical axis direction. A lens may be coupled to the hole of the bobbin 110. The bobbin 110 and the lens may be coupled by screw-coupling and/or an adhesive. The first coil 120 may be coupled to the bobbin 110. An upper elastic member 410 may be coupled to an upper or upper surface of the bobbin 110. A lower elastic member 420 may be coupled to a lower portion or lower surface of the bobbin 110. The bobbin 110 may be coupled to the elastic member 400 by heat fusion and/or an adhesive. The adhesive that couples the bobbin 110 and the lens, and the bobbin 110 and the elastic member 400 may be an epoxy cured by at least one of ultraviolet (UV), heat, and laser.

The lens driving device may comprise a first coil 120. The first coil 120 may be an 'AF driving coil' used for AF driving. The first coil 120 may be disposed on the bobbin 110. The first coil 120 may be disposed between the bobbin 110 and the housing 210. The first coil 120 may be disposed on an outer lateral surface or an outer circumferential surface of the bobbin 110. The first coil 120 may be directly wound on the bobbin 110. Or, the first coil 120 may be coupled to the bobbin 110 while being directly wound. The first coil 120 may face a magnet 220. The first coil 120 may be disposed to face the magnet 220. The first coil 120 may electromagnetically interact with the magnet 220. In this case, when an electric current is supplied to the first coil 120 and an electromagnetic field is formed around the first coil 120, the first coil 120 can move with respect to the magnet 220 due to the electromagnetic interaction between the first coil 120 and the magnet 220. The first coil 120 may be formed as a single coil. Or, the first coil 120 may comprise a plurality of coils spaced apart from each other.

The first coil 120 may comprise a pair of lead wires for supplying power. At this time, one end (lead wire) of the first coil 120 may be coupled to a first coupling portion 424 of a first lower elastic unit 420a. The other end (lead wire) of the first coil 120 may be coupled to the first coupling portion 424 of a second lower elastic unit 420b. In addition, the first and second lower elastic units 420a and 420b may be connected to a substrate 711 to which a first Hall sensor 712 is coupled. Through this, a driver IC-integrated first Hall sensor 712 and the first coil 120 may be electrically connected. The first coil 120 may receive current under the control of the driver IC-integrated first Hall sensor 712.

The lens driving device may comprise a second mover 200. The second mover 200 may be movably coupled to a stator 300 through a support member 500. The second mover 200 may support the first mover 100 through the elastic member 400. The second mover 200 may move the first mover 100 or may move together with the first mover 100. The second mover 200 may move through interaction with the stator 300. The second mover 200 may move during OIS driving. At this time, the second mover 200 may be referred to as an 'OIS mover'. The second mover 200 may move integrally with the first mover 100 during OIS driving.

The lens driving device may comprise a housing 210. The housing 210 may be disposed to surround at least a portion of the bobbin 110. The housing 210 may accommodate at least a portion of the bobbin 110 therein. The housing 210 may be disposed in a cover 600. The housing 210 may be disposed between the cover 600 and the bobbin 110. The housing 210 may be formed of a material different from that of the cover 600. The housing 210 may be formed of an insulating material. The housing 210 may be formed of an injection product. The outer lateral surface of the housing 210 may be spaced apart from the inner surface of a lateral plate 620 of the cover 600. The housing 210 can be moved for OIS driving through the separation space between the housing 210 and the cover 600. A magnet 220 may be disposed in the housing 210. The housing 210 and the magnet 220 may be coupled by an adhesive. An upper elastic member 410 may be coupled to the upper portion or upper surface of the housing 210. A lower elastic member 420 may be coupled to the upper portion or lower surface of the housing 210. The housing 210 may be coupled to the elastic member 400 by heat fusion and/or an adhesive. The adhesive that couples the housing 210 and the magnet 220 and the housing 210 and the elastic member 400 may be an epoxy cured by at least one of ultraviolet (UV), heat, and laser.

The lens driving device may comprise a magnet 220. The magnet 220 may be disposed in the housing 210. The magnet 220 may be fixed to the housing 210 by an adhesive. The magnet 220 may be disposed between the bobbin 110 and the housing 210. The magnet 220 may face the first coil 120. The magnet 220 may electromagnetically interact with the first coil 120. The magnet 220 may face the second coil 331. The magnet 220 may electromagnetically interact with the second coil 331. The magnet 220 may be used in common in AF driving and OIS driving. The magnet 220 may be disposed on the side of the housing 210. At this time, the magnet 220 may be a flat magnet having a flat plate shape. As a modified embodiment, the magnet 220 may be disposed at a corner portion of the housing 210. At this time, the magnet 220 may be a corner magnet having a hexahedral shape in which the inner lateral surface is wider than the outer lateral surface.

The lens driving device may comprise a stator 300. The stator 300 may be disposed under the first and second movers 200 and 300. The stator 300 may movably support the second mover 200. The stator 300 may move the second mover 200. At this time, the first mover 100 may also move together with the second mover 200.

The lens driving device may comprise a base 310. The base 310 may be disposed under the housing 210. The base 310 may be disposed under the bobbin 110. The base 310 may be disposed under the first substrate 320. The base 310 may be spaced apart from the housing 210. The base 310 may be coupled with the cover 600. The base 310 may be disposed on a printed circuit board.

The base 310 may comprise a lateral surface. The lateral surface of the base 310 may comprise a plurality of lateral surfaces. The plurality of lateral surfaces of the base 310 may comprise a fifth lateral surface 310a, a sixth lateral surface 310b disposed opposite to the fifth lateral surface 310a, a seventh lateral surface 310c disposed opposite to each other between the fifth lateral surface 310a and the sixth lateral surface 310b, and an eighth lateral surface 310d. The base 310 may comprise four lateral surfaces and four corners disposed between the four lateral surfaces. A seventh groove 310e may be formed at the corner of the base 310. The seventh groove 310e of the base 310 may have a shape to avoid the second conductive member 800 that couples the first substrate 320 and the support member 500. That is, the base 310 may have a shape escaping the support member 500 and the second conductive member 800. Through this, the support member 500 can be seen when viewed from below the lens driving device. In this case, the support member 500 may be soldered to the third terminal 325 of the first substrate 320 from below.

The base 310 may comprise a second groove 311. The second groove 311 may be formed on an upper surface of the base 310. The second groove 311 may be formed at a position corresponding to one or more of a first terminal 324 and the second terminal 332. The second groove 311 may be formed at a position corresponding to the first terminal 324. The second groove 311 may be formed at a position corresponding to a second terminal 332. A solder ball connecting the first terminal 324 and the second terminal 332 may be disposed in the second groove 311. The first terminal 324 of the first substrate 320 and the second terminal 332 of the second substrate 330 are coupled through soldering, and at least a portion of the solder may be disposed in the second groove 311 of the base 310. The second groove 311 may be disposed closer to an outer circumference of the base 310 than a first hole 312 of the base 310. The second groove 311 is disposed adjacent to the outer circumference of the base 310, through which a first protruding portion 316, which is an inner component of the base 310, can be used as a mechanical guide when coupling the base 310 with the first substrate 320 and the second substrate 330. The second groove 311 may be a rectangular groove. The second groove 311 may comprise four grooves. The second groove 311 may be disposed adjacent to the corner of the base 310. The second groove 311 may be connected to a second protruding portion 318 forming an outer circumference.

The base 310 may comprise a first hole 312. The first hole 312 may be formed in the base 310 at a position corresponding to the hole of the bobbin 110 in the optical axis direction. Light passing through the lens being coupled to the bobbin 110 may pass through the first hole 312 of the base 310. The first hole 312 may comprise a through hole or an opening.

The base 310 may comprise a third groove 313. The third groove 313 may be formed in each of the fifth lateral surface 310a and the sixth lateral surface 310b of the base 310. A bent portion 326 of the first substrate 320 may be disposed in the third groove 313 of the base 310. The third groove 313 may be formed in a shape corresponding to the bent portion 326 of the first substrate 320. The recessed depth of the third groove 313 may correspond to the thickness of the bent portion 326 of the first substrate 320. Or, the recessed depth of the third groove 313 may be smaller than the thickness of the bent portion 326 of the first substrate 320. Through this, a state in which the fourth terminal 327 formed in the bent portion 326 of the first substrate 320 disposed in the third groove 313 is in contact with the inner surface of the lateral plate 620 of the cover 600 may be maintained without a separate adhesive.

The base 310 may comprise a fourth groove 314. The fourth groove 314 may be formed in each of the seventh lateral surface 310c and the eighth lateral surface 310d of the base 310. An extension portion 322 of the first substrate 320 may be disposed in the fourth groove 314 of the base 310. The fourth groove 314 may be formed in a shape corresponding to the extension portion 322 of the first substrate 320. The width of the fourth groove 314 in the horizontal direction may correspond to the width of the extension portion 322 of the first substrate 320 in the horizontal direction.

The base 310 may comprise an extension portion 314a. The extension portion 314a may support the extension portion 322 of the first substrate 320. The extension portion 322 of the first substrate 320 may be disposed along the outer surface of the extension portion 314a. The extension portion 314a may be protruded from the lower surface of the base 310. The extension portion 314a may comprise a fourth groove 314. That is, the fourth groove 314 may be continuously formed on the lateral surface of the base 310 and the extension portion 314a.

The base 310 may comprise a second hole 315. The second hole 315 may be spaced apart from the second groove 311. A second Hall sensor 721 may be disposed in the second hole 315. The second hole 315 may be formed in a shape and size corresponding to the second Hall sensor 721. The second hole 315 may comprise a second-first hole accommodating a second-first hall sensor 721-1, and a second-second hole accommodating the second-second hall sensor 721-2. The second hole 315 may comprise a through hole or an opening.

The base 310 may comprise a first protruding portion 316. The first protruding portion 316 may be used as a 'protruding portion'. The first protruding portion 316 may extend from an upper surface of the base 310 along an inner circumferential surface of the first hole 312 of the base 310. That is, the first protruding portion 316 may extend from an upper surface of the base 310 and form an inner circumferential surface of the base 310. The first protruding portion 316 may be inserted into the third holes 328 and 333 of the first substrate 320 and the second substrate 330. Through this, the first protruding portion 316 of the base 310 may function as a mechanical guide when the first substrate 320 and the second substrate 330 are assembled. That is, through the corresponding shape of the first protruding portion 316 of the base 310 and the first substrate 320 and the second substrate 330, the first substrate 320 and the second substrate 330 may be assembled in position with respect to the base 310. The first protruding portion 316 may comprise a lug or a protrusion.

The base 310 may comprise a first protrusion 317. The first protrusion 317 may be used as a 'protrusion'. The first protrusion 317 may protrude outward from the first protruding portion 316. The first protrusion 317 may be protruded from the first protruding portion 316 in a semicircular shape. That is, the shape of the cross section of the first protrusion 317 may be semicircular. Three first protrusions 317 may be formed on the first protruding portion 316. The first protrusion 317 may be inserted into the fifth grooves 329 and 334 of the first substrate 320 and the second substrate 330. Through this, the first protrusion 317 of the base 310 may serve as a mechanical guide when the first substrate 320 and the second substrate 330 are assembled. Further, rotation phenomenon of the first substrate 320 and the second substrate 330 assembled on the base 310 may be inhibited.

The base 310 may comprise a second protruding portion 318. The second protruding portion 318 may extend from the upper surface of the base 310 along the outer circumferential surface of the base 310. That is, the second protruding portion 318 may extend from an upper surface of the base 310 and form an outer circumferential surface of the base 310. The second protruding portion 318 may form a step with the upper surface of the base 310. A second groove 311 may be disposed immediately adjacent to the in of the second protruding portion 318.

The base 310 may comprise a second protrusion 319. The second protrusion 319 may be formed on an outer lateral surface of the base 310. The second protrusion 319 may be formed to be protruded outward from the lateral surface of the base 310. A lower end of the lateral plate 620 of the cover 600 may be disposed on an upper surface of the second protrusion 319. The second protrusion 319 may be spaced apart from each other in a total of eight, two each on four lateral surfaces of the base 310.

The lens driving device may comprise a first substrate 320. The first substrate 320 may comprise a second substrate 330. However, the first substrate 320 may be described as a separate member of the second substrate 330. The first substrate 320 may be disposed on the base 310. The first substrate 320 may be disposed between the housing 210 and the base 310. A support member 500 may be coupled to the first substrate 320. The first substrate 320 may supply power to the second coil 331. The first substrate 320 may be coupled with the second substrate 330. The first substrate 320 may be coupled to the second coil 331. The first substrate 320 may be coupled to a printed circuit board disposed under the base 310. The first substrate 320 may comprise a flexible printed circuit board (FPCB). The first substrate 320 may be partially bent.

The first substrate 320 may comprise a body portion 321. The body portion 321 may be disposed on an upper surface of the base 310. The body portion 321 may be disposed between the base 310 and the second substrate 330. The body portion 321 may be formed to have a size corresponding to the second substrate 330. The body portion 321 may be coupled to the second substrate 330.

The first substrate 320 may comprise a lateral surface. The first substrate 320 may comprise a plurality of lateral surfaces. The outer circumference of the body portion 321 of the first substrate 320 may comprise a first lateral surface 321a, a second lateral surface 321b disposed on the opposite side of the first lateral surface 321a, a third lateral surface 321c disposed opposite to each other between the first lateral surface 321a and the second lateral surface 321b, and a fourth lateral surface 321d.

The first substrate 320 may comprise an extension portion 322. The extension portion 322 may extend from the body portion 321. The extension portion 322 may extend downward from the outer circumference or edge of the body portion 321. The extension portion 322 may be disposed on the lateral surface of the base 310. The extension portion 322 may be disposed in the fourth groove 314 formed on the side of the base 310. The extension portion 322 may be disposed on each of the third lateral surface 321c and the fourth lateral surface 321d. A plurality of terminals may be formed on the extension portion 322.

The plurality of terminals of the first substrate 320 may comprise 16 terminals. Of the 16 terminals, four terminals are connected to each of the four wires of the support member 500, the other four terminals are connected to the second coil 331, and the other seven terminals are connected to the second Hall sensor 721, and the remaining one terminal may be connected to the cover 600. The terminals connected to the four wires may be electrically connected to the substrate 711 on which the first Hall sensor 712 is disposed. Two of the four terminals connected to the second coil 331 may be connected to the second-first coil, and the other two terminals may be connected to the second-second coil disposed in a different direction from the second-first coil. Three of the seven terminals connected to the second Hall sensor 721 are connected to a second-first Hall sensor 721-1, the other three terminals are connected to a second-second Hall sensor 721-2, and the remaining one terminal may be connected to both the second-first Hall sensor 721-1 and the second-second Hall sensor 721-2. That is, one of the seven terminals may be used common for the second-first Hall sensor 721-1 and the second-second Hall sensor 721-2. In more detail, each of the second-first Hall sensor 721-1 and the second-second Hall sensor 721-2 is provided with a positive (+) input terminal, a negative (−) input terminal, a positive (+) output terminal, and a negative (−) output terminal. The negative (−) input terminal can be used in common. A terminal connected to the cover 600 may be used for the ground of the cover 600. The plurality of terminals of the first substrate 320 may be connected to the printed circuit board through a conductive member.

The first substrate 320 may comprise a first groove 323. The first groove 323 may be formed on an outer circumference of the body portion 321 of the first substrate 320. The first groove 323 may be disposed at a position corresponding to the second terminal 332 of the second substrate 330. Through this, the first groove 323 may expose at least a portion of the second terminal 332 of the second substrate 330 downward. That is, the first groove 323 may provide an escape space so that the conductive member may contact the second terminal 332 of the second substrate 330. A first conductive member may be disposed in the first groove 323. The first groove 323 may be formed in a U-shape. The first groove 323 may be recessed from the lateral surface of the first substrate 320 to a portion in which the inner side end of the second terminal 332 of the second substrate 330 is formed.

The first groove 323 may comprise a plurality of grooves. The first groove 323 may comprise four grooves. The first groove 323 may comprise a first-first groove 323-1 that is recessed from the first lateral surface 321a of the body portion 321 of the first substrate 320 and spaced apart from each other, a first-second groove 323-2, a first-third groove 323-3 recessedly formed from the second lateral surface 321b of the body portion 321 of the first substrate 320 and spaced apart from each other, and a first-fourth groove 323-4. The first-first groove 323-1 to first-fourth groove 323-4 may be symmetrical with respect to an optical axis corresponding to the central axis of the first substrate 320.

The first substrate 320 may comprise a first terminal 324. The first terminal 324 may extend from the first groove 323. The first terminal 324 may extend along the lower surface of the first substrate 320. The second terminal 332 of the second substrate 330 is formed on the lower surface of the second substrate 330, and the first terminal 324 of the first substrate 320 is formed on the lower surface of the first substrate 320. Although the height is different, the first terminal 324 and the second terminal 332 may be continuously disposed when viewed from below the first substrate 320. Through this structure, the first terminal 324 and the second terminal 332 may be connected by a first conductive member disposed in the first groove 323. The first terminal 324 may have a rectangular shape. The first terminal 324 may extend only to one side of the first groove 323 and may not be disposed on the opposite side. That is, the first terminal 324 may be formed only in a portion of the first groove 323. In the present embodiment, the first terminal 324 may be disposed so as to surround only a portion of the first groove 323 rather than the entirety. However, in the modified embodiment, the first terminal 324 may be disposed to surround the entire first groove 323. The first terminal 324 may be formed of a conductive material. Meanwhile, terminals other than the first terminal 324 may also be formed of a conductive material.

In this embodiment, the first terminal 324 of the first substrate 320 may comprise four terminals. At this time, two of the four terminals are disposed adjacent to the first lateral surface 321a of the body portion 321 of the first substrate 320, and the remaining two terminals may be disposed adjacent to the second lateral surface 321b of the body portion 321 of the first substrate 320. Through this, since there is no first terminal 324, which is a solder terminal, on the side of the extension portion 322 in which the terminal is arranged on the first substrate 320, even if the number of terminals disposed in the extension portion 322 increases, the soldering workability between the lens driving device and the printed circuit board of the camera module can be secured by increasing the width or pitch of the extension portion 322.

The first terminal 324 may comprise a plurality of terminals. The first terminal 324 may comprise four terminals. Two of the four terminals of the first terminal 324 are electrically connected to a second-first coil, and the other two terminals may be electrically connected to a second-second coil disposed in a different direction from the second-first coil. The first terminal 324 of the first substrate 320 may comprise a first-first terminal 324-1 extending from the first-first groove 323-1, a first-second terminal 324-2 extending from the first-second groove 323-2, a first-third terminal 324-3 extending from the first-third groove 323-3, and a first-fourth terminal 324-4 extending from the first-fourth groove 323-4. At this time, the first-first terminal 324-1 to the first-fourth terminal 324-4 may be spaced apart from one another. first-first terminal 324-1 to first-fourth terminal 324-4 may be symmetrical with respect to the optical axis corresponding to the central axis of the first substrate 320. The first-first terminal 324-1 extends from the first-first groove 323-1 toward the first-second groove 323-2, the first-second terminal 324-2 extends from first-second groove 323-2 toward the first-first groove 323-1, the first-third terminal 324-3 extends from the first-third groove 323-3 toward the first-fourth groove 323-4, and the first-fourth terminal 324-4 may extend from the first-fourth groove 323-4 toward the first-third terminal 324-3. In this embodiment, the first-first terminal 324-1 and the first-second terminal 324-2 may be disposed between a third-first terminal 325-1 and a third-second terminal 325-2. The first substrate 320 may comprise a third terminal 325. The third terminal 325 may be formed on the lower surface of the first substrate 320. The third terminal 325 may be coupled to the support member 500. The third terminal 325 may be electrically connected to the support member 500 through the second conductive member 800. The third terminal 325 may be formed in a circular shape. The diameter of the third terminal 325 may be larger than the diameter of the second conductive member 800. In this embodiment, the wire of the support member 500 may be coupled to the third terminal 325 of the first substrate 320 through soldering. In other words, the lower end of the wire is coupled to the lower surface of the first substrate 320, and in this case, it is advantageous to secure the length of the wire compared to the case where the wire is coupled to the second substrate 330 or the upper surface of the first substrate 320.

The third terminal 325 may comprise a plurality of terminals. The third terminal 325 may comprise four terminals. The third terminal 325 may comprise a third-first terminal 325-1 to a third-fourth terminal 325-4 respectively coupled to the four wires of the support member 500. The third-first terminal 325-1 and the third-second terminal 325-2 may be disposed closer to the first lateral surface 321a than the second lateral surface 321b of the first substrate 320. The third-third terminal 325-3 and the third-fourth terminal 325-4 may be disposed closer to the second lateral surface 321b than the first lateral surface 321a of the first substrate 320.

The first substrate 320 may comprise a bent portion 326. The bent portion 326 may extend from each of the first lateral surface 321a and the second lateral surface 321b of the first substrate 320. The bent portion 326 may be disposed in the third groove 313 of the base 310. The bent portion 326 may extend downward from the outer circumference or edge of the body portion 321. The bent portion 326 may be formed to be shorter than the extension portion 322.

The first substrate 320 may comprise a fourth terminal 327. The fourth terminal 327 may be disposed on the outer surface of the bent portion 326. The fourth terminal 327 may be in contact with the inner surface of the lateral plate 620 of the cover 600. Through this, the fourth terminal 327 and the lateral plate 620 of the cover 600 may be electrically connected.

The first substrate 320 may comprise a third hole 328. The third hole 328 may correspond to the first protruding portion 316 of the base 310. The diameter of the third hole 328 may correspond to the diameter of the first protruding portion 316 of the base 310. Through this, the first substrate 320 may be disposed in a correct position on the base 310. The first protruding portion 316 of the base 310 may be inserted into the third hole 328 of the first substrate 320 in a correct position. The third hole 328 may comprise a through hole or an opening. A light passing through the lens may move through the third hole 328.

The first substrate 320 may comprise a fifth groove 329. The fifth groove 329 may be formed in a shape corresponding to the first protrusion 317 at a position corresponding to the first protrusion 317 on the inner circumferential surface of the third hole 328. The fifth groove 329 may be formed in a semicircular shape. The first protrusion 317 of the base 310 may be inserted into the fifth groove 329.

The lens driving device may comprise a second substrate 330. The second substrate 330 may be disposed on an upper surface of the body portion 321 of the first substrate 320. The second substrate 330 may be disposed between the magnet 220 and the base 310. The second substrate 330 may comprise a circuit member. The second substrate 330 may comprise a fine pattern coil (FP-coil). The second substrate 330 may be a member in which the FP-coil is formed on the FPCB.

The second substrate 330 may comprise a second coil 331. The second coil 331 may be an 'OIS driving coil' used for OIS driving. The second coil 331 may face the magnet 220. The second coil 331 may electromagnetically interact with the magnet 220. In this case, when a current is supplied to the second coil 331 and a magnetic field is formed around the second coil 331, the magnet 220 can move with respect to the second coil 331 due to electromagnetic interaction between the second coil 331 and the magnet 220. The second coil 331 may move the housing 210 and the bobbin 110 in a direction perpendicular to the optical axis with respect to the base 310 through electromagnetic interaction with the magnet 220. The second coil 331 may be a fine pattern coil (FP coil) integrally formed on the second substrate 330.

The second substrate 330 may comprise a second terminal 332. The second terminal 332 may be disposed on a lower surface of the second substrate 330. The second terminal 332 may be connected to the first terminal 324 of the first substrate 320 through a first conductive member. The second terminal 332 may be exposed through the first groove 323 of the first substrate 320.

The second terminal 332 may comprise a plurality of terminals. The second terminal 332 may comprise four terminals. Two of the four terminals of the second terminal 332 are electrically connected to the second-first coil, and the other two terminals may be electrically connected to the second-second coil disposed in a different direction from the second-first coil. The second terminal 332 may comprise a second-first terminal 332-1 connected to the first-first terminal 324-1, a second-second terminal 332-2 connected to the first-second terminal 324-2, a second-third terminal 332-3 connected to the first-third terminal 324-3, and a second-fourth terminal 332-4 connected to the first-fourth terminal 324-4. The second-first to second-fourth terminals may be spaced apart from each other. The second-first to second-fourth terminals 332-1, 332-2, 332-3, and 332-4 may be symmetrical with respect to the optical axis corresponding to the central axis of the second substrate 330.

The second substrate 330 may comprise a third hole 333. The third hole 333 of the second substrate 330 may be formed in a size and shape corresponding to the third hole 328 of the first substrate 320. The third hole 333 may correspond to the first protruding portion 316 of the base 310. The diameter of the third hole 333 may correspond to the diameter of the first protruding portion 316 of the base 310. Through this, the second substrate 330 may be disposed in a correct position on the base 310. The first protruding portion 316 of the base 310 may be inserted into the third hole 333 of the second substrate 330 in a correct position. The third hole 333 may comprise a through hole or an opening. A light passing through the lens may move through the third hole 333.

The second substrate 330 may comprise a fifth groove 334. The fifth groove 334 of the second substrate 330 may be formed in a size and shape corresponding to the fifth groove 329 of the first substrate 320. The fifth groove 334 may be formed in a shape corresponding to the first protrusion 317 at a position corresponding to the first protrusion 317 on the inner circumferential surface of the third hole 333. The fifth groove 334 may be formed in a semicircular shape. The first protrusion 317 of the base 310 may be inserted into the fifth groove 334.

The second substrate 330 may comprise a sixth groove 335. The sixth groove 335 may be formed by being recessed from the outer circumference of the second substrate 330. The sixth groove 335 may be formed so as not to interfere with the support member 500. The second substrate 330 may not be in contact with the support member 500 by the sixth groove 335.

In the present embodiment, soldering of the first substrate 320 and the second substrate 330 is performed first, and then the coupled body of the first substrate 320 and the second substrate 330 can be assembled to the base 310.

The lens driving device may comprise an elastic member 400. The elastic member 400 may be coupled to the bobbin 110 and the housing 210. The elastic member 400 may elastically support the bobbin 110. The elastic member 400 may have elasticity at least in portion. The elastic member 400 may movably support the bobbin 110. The elastic member 400 may support movement of the bobbin 110 during AF driving. At this time, the elastic member 400 may be referred to as an 'AF support member'.

The lens driving device may comprise an upper elastic member 410. The upper elastic member 410 may be coupled to an upper portion or upper surface of the bobbin 110 and an upper portion or upper surface of the housing 210. The upper elastic member 410 may be coupled to the support member 500. The upper elastic member 410 may be formed of a plate spring.

The upper elastic member 410 may comprise a plurality of upper elastic units. The upper elastic member 410 may comprise four upper elastic units. The upper elastic member 410 may comprise first to fourth upper elastic units 410a, 410b, 410c, and 410d spaced apart from one another. The first upper elastic unit 410a is connected to a first wire and a first terminal of the substrate 711, the second upper elastic unit 410b is connected to a second wire and a second terminal of the substrate 711, the third upper elastic unit 410c may be connected to a third wire and a third terminal of the substrate 711, and the fourth upper elastic unit 410d may be connected to a fourth wire and a fourth terminal of the substrate 711.

The upper elastic member 410 comprises: an outer side portion 411 coupled to an upper portion or an upper surface of the housing 210; an inner side portion 412 coupled to an upper portion or an upper surface of the bobbin 110; and a connection portion 413 for connecting the outer side portion 411 and the inner portion 412; a terminal portion 414 connected to a terminal of the substrate 711; and a coupling portion 415 connected to the support member 500.

The lens driving device may comprise a lower elastic member 420. The lower elastic member 420 may be coupled to a lower portion or a lower surface of the bobbin 110 and a lower portion or a lower surface of the housing 210. The lower elastic member 420 may be formed of a plate spring.

The lower elastic member 420 may comprise a plurality of lower elastic units. The lower elastic member 420 may comprise two lower elastic units. The lower elastic member 420 may comprise first to second lower elastic units 420a and 420b spaced apart from each other. The first lower elastic unit 420a is connected to one end portion of the first coil 120 and the fifth terminal of the substrate 711, and the second lower elastic unit 420b may be connected to the other end portion of the first coil 120 and the sixth terminal of the substrate 711.

The lower elastic member 420 may comprise: an outer side portion 421 coupled to a lower portion or a lower surface of the housing 210; an inner side portion 422 coupled to a lower portion or a lower surface of the bobbin 110; a connection portion 423 connecting the outer side portion 421 and the inner side portion 422; a first coupling portion 424 coupled to the first coil 120; and a second coupling portion 425 coupled to the substrate 711.

The lens driving device may comprise a support member 500. The support member 500 may be coupled to the upper elastic member 410 and the body portion 321 of the first substrate 320. Or, as a modified embodiment, the support member 500 may be coupled to the second substrate 330. The support member 500 may movably support the housing 210. The support member 500 may elastically support the housing 210. The support member 500 may have elasticity at least in portion. The support member 500 may support movement of the housing 210 and the bobbin 110 during OIS driving. At this time, the support member 500 may be referred to as an 'OIS support member'. The support member 500 may comprise an elastic member. The support member 500 may be formed of a wire. The support member 500 may be formed of a wire spring. As a modified embodiment, the support member 500 may be formed of a plate spring.

The support member 500 may comprise a plurality of wires. The support member 500 may comprise four wires. The support member 500 may comprise first to fourth wires spaced apart from one another. The first wire connects the third-first terminal 325-1 of the first substrate 320 and the first upper elastic unit 410a, the second wire connects the third-second terminal 325-2 of the first substrate 320 and the second upper elastic unit 410b, the third wire connects the third-third terminal 325-3 of the first substrate 320 and the third upper elastic unit 410c, and the fourth wire may connect the third-fourth terminals 325-4 of the first substrate 320 to the fourth upper elastic unit 410d. The wire may be connected to either the first substrate 320 or the second substrate 330.

The lens driving device may comprise a cover 600. The cover 600 may comprise a 'cover can'. The cover 600 may be disposed to surround at least a portion of the housing 210. The cover 600 may be coupled to the base 430. The cover 600 may accommodate the housing 210 therein. The cover 600 may form the outer appearance of the lens driving device. The cover 600 may have a hexahedral shape with an open bottom surface. The cover 600 may be a non-magnetic material. The cover 600 may be formed of a metal material. The cover 600 may be formed of a metal plate. The cover 600 may be connected to the fourth terminal 327 of the first substrate 320. Through this, the cover 600 may be grounded. The cover 600 may block electromagnetic interference (EMI). At this time, the cover 600 may be referred to as 'EMI shield can'.

The cover 600 may comprise an upper plate 610 and a lateral plate 620. The cover 600 may comprise an upper plate 610 disposed on the bobbin 110 and a lateral plate 620 extending downward from an outer circumference or edge of the upper plate 610. The upper plate 610 of the cover 600 may comprise a hole or an opening. The lateral plate 620 of the cover 600 may be coupled to the base 310. The lower end of the lateral plate 620 of the cover 600 may be disposed on the second protrusion 319 of the base 430. The inner surface of the lateral plate 620 of the cover 600 may be fixed to the base 430 by an adhesive.

The lens driving device may comprise a substrate 711. The substrate 711 may be disposed on the housing 210. A first Hall sensor 712 may be disposed on the inner lateral surface of the substrate 711. A plurality of terminals may be disposed on the outer lateral surface of the substrate 711. The plurality of terminals of the substrate 711 may comprise six terminals. Of the six terminals of the substrate 711, four terminals may comprise first to fourth terminals, and the first to fourth terminals are connected to the first to fourth upper elastic units 410a, 410b, 410c, 410d, respectively. Of the six terminals of the substrate 711, the remaining two terminals comprise fifth and sixth terminals, and the fifth and sixth terminals may be connected to the first and second lower elastic units 420a and 420b, respectively.

The lens driving device may comprise a first Hall sensor 712. The first Hall sensor 712 may comprise a Hall sensor 712 that senses magnetic force of the magnet. The first Hall sensor 712 may be a Hall sensor integrated with a driver IC in which a driver that controls current application to the first coil 120 is embedded. The first Hall sensor 712 may be electrically connected to the first coil 120. The first Hall sensor 712 may detect the first magnet 713 disposed on the bobbin 110. The first Hall sensor 712 performs an AF function by controlling the current applied to the first coil 120, and meanwhile, feedback control may be performed on the first coil 120 by determining the position of the bobbin 110 through the magnetic force detection of the first magnet 713. The first Hall sensor 712 may comprise a plurality of terminals. The first Hall sensor 712 may comprise six terminals. Four of the six terminals of the first hall sensor 712 are connected to the outside through the upper elastic member 410, the support member 500, and the first substrate 320, and the remaining two terminals may be connected to the first coil 120 through the lower elastic member 420.

The lens driving device may comprise a first magnet 713. The first magnet 713 may be a 'sensing magnet'. The first magnet 713 may be disposed on the bobbin 110. The first magnet 713 may be detected by the first Hall sensor 712. The first magnet 713 may face the first Hall sensor 712. The first magnet 713 may be disposed at a corner of the bobbin 110. That is, the first magnet 713 may be disposed to face the corner of the housing 210.

The lens driving device may comprise a second magnet 714. The second magnet 714 may be a 'compensation magnet'. The second magnet 714 may be disposed on the bobbin 110. The second magnet 714 may be disposed to balance magnetic force with the first magnet 713. The second magnet 714 may be symmetrical with the first magnet 713 about the optical axis. The second magnet 714 may be disposed at a position corresponding to the first magnet 713 around the optical axis. The second magnet 714 may have a size and/or shape corresponding to the first magnet 713 around the optical axis. A first magnet 713 may be disposed on one side of the bobbin 110 and a second magnet 714 may be disposed on the other side of the bobbin 110. The second magnet 714 may be disposed at a corner of the bobbin 110. That is, the second magnet 714 may be disposed to face the corner of the housing 210.

The lens driving device may comprise a second Hall sensor 721. The second Hall sensor 721 may be used as a 'Hall sensor'. The second Hall sensor 721 may be disposed on a lower surface of the first substrate 320. The second Hall sensor 721 may be disposed in the second hole 315 of the base 310. The second Hall sensor 721 may detect the magnetic force of the magnets 220. The Hall value measured by the second Hall sensor 721 may be used for OIS feedback control. The second Hall sensor 721 may comprise a second-first Hall sensor 721-1 that detects the magnetic force of the magnets disposed in the x-axis direction among the magnets 220, and a second-second Hall sensor 721-2 for sensing the magnetic force of the magnet disposed in the y-axis direction.

The lens driving device may comprise a conductive member. The conductive member can be used to electrically connect two or more members. The conductive member may comprise at least one of a solder ball and an Ag epoxy.

The conductive member may comprise a first conductive member connecting the first terminal 324 of the first substrate 320 and the second terminal 332 of the second substrate 330. The 'first conductive member' may be used as the 'conductive member'. At least a portion of the first conductive member may be disposed in the second groove 311 of the base 310. The first conductive member may be accommodated in the second groove 311 of the base 310. Through this, a phenomenon in which the first substrate 320 and the second substrate 330 are lifted by the first conductive member can be minimized.

The conductive member may comprise a second conductive member 800 connecting the wire and the first substrate 320. The conductive member may be used to connect the terminal of the extension portion 322 of the first substrate 320 and the printed circuit board. The conductive member may be used to connect the first substrate 320 and the support member 500. The conductive member may be used to connect the first terminal 324 of the first substrate 320 and the second terminal 332 of the second substrate 330. The conductive member may be used to connect the support member 500 and the upper elastic member 410. The conductive member may be used to connect the upper elastic member 410 and the substrate 711. The conductive member may be used to connect the first coil 120 and the lower elastic member 420. The conductive member may be used to connect the lower elastic member 420 and the substrate 711.

The lens driving device may comprise a damper (not shown). The damper may be disposed on the support member 500. The damper may be disposed on the support member 500 and the housing 210. The damper may be disposed on the elastic member 400. The damper may be disposed on the elastic member 400 and the bobbin 110 and/or the elastic member 400 and the housing 210. The damper may be disposed on the elastic member 400 and/or the support member 500 to prevent inhibit a resonance phenomenon generated in the elastic member 400 and/or the support member 500.

Hereinafter, a configuration of a lens driving device according to a modified embodiment will be described with reference to the drawings.

Figure 12:
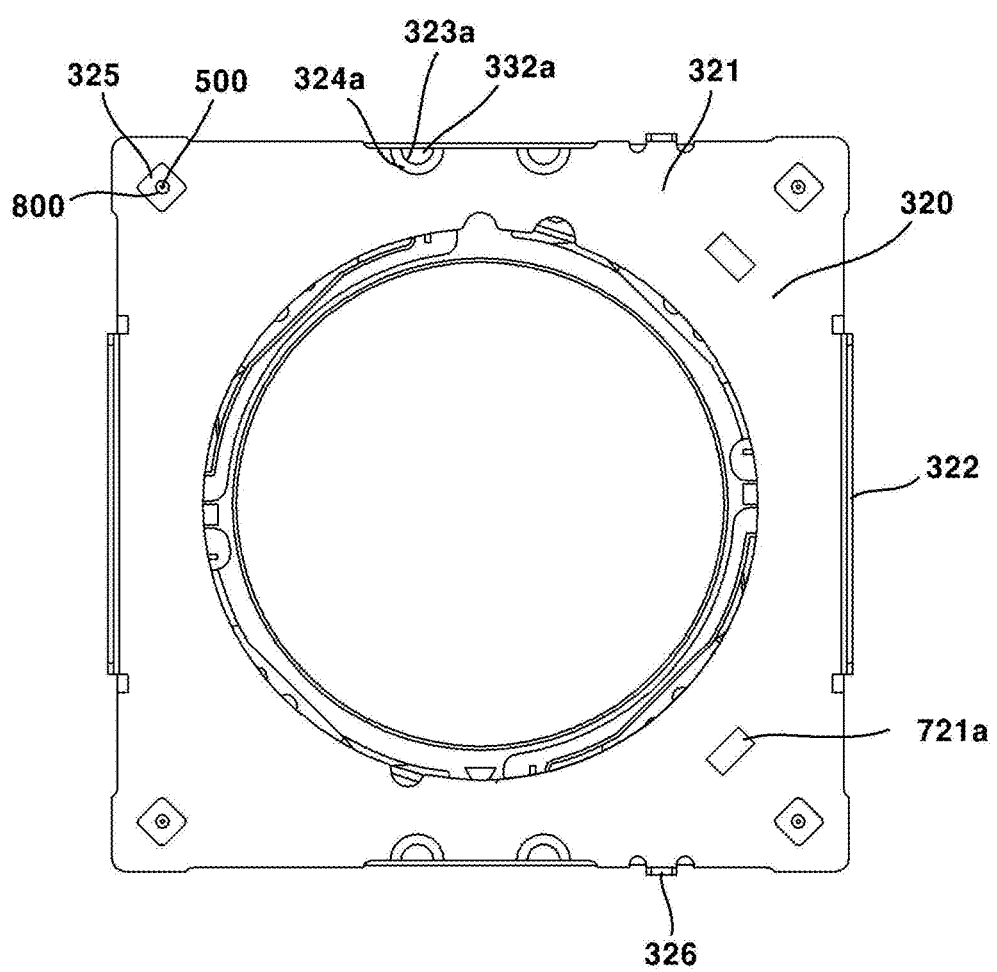
FIG. 12 is a bottom view of some components of a lens driving device according to a modified embodiment.
Figure 13:
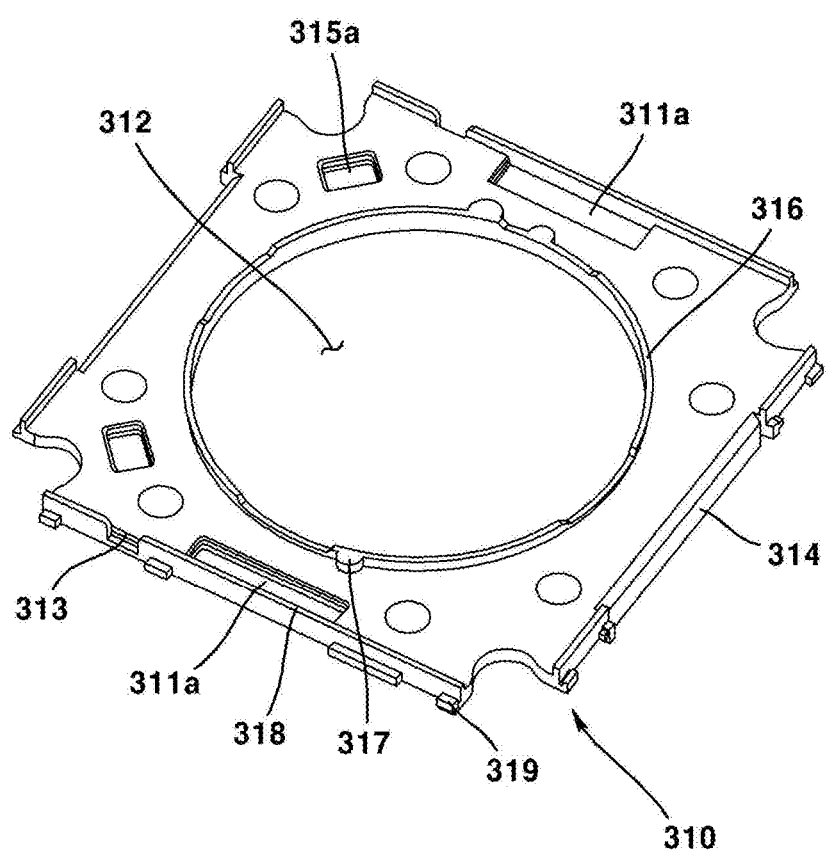
FIG. 13 is a perspective view of a base of a lens driving device according to a modified embodiment.

FIG. 12 is a bottom view of some components of a lens driving device according to a modified embodiment, and FIG. 13 is a perspective view of a base of a lens driving device according to a modified embodiment.

In a lens driving device according to the modified embodiment, compared to the present embodiment, a location of a soldering portion connecting the first substrate 320 and the second substrate 330 may be disposed closer to improve solder coating workability. Hereinafter, the modified embodiment will be described focusing on differences from the present embodiment. That is, the description in the present embodiment can be applied by analogy to the configuration of the modified embodiment that has not been described.

The lens driving device according to the modified embodiment may comprise a first groove 323a of the first substrate 320. The first groove 323a may be formed on the outer circumference of the body portion 321 of the first substrate 320. The first groove 323a may be disposed at a position corresponding to the second terminal 332a of the second substrate 330. Through this, the first groove 323a may downwardly expose at least a portion of the second terminal 332a of the second substrate 330. That is, the first groove 323a may provide an escape space so that the conductive member may be in contact with the second terminal 332a of the second substrate 330. A first conductive member may be disposed in the first groove 323a. The first groove 323a may be formed in a semicircular shape. Or, the first groove 323a may be formed in a U-shape. The first groove 323a may be recessed from the lateral surface of the first substrate 320 to a portion in which an end portion of the inner side of the second terminal 332a of the second substrate 330 is formed.

The first groove 323a may comprise a plurality of grooves. The first groove 323a may comprise four grooves. The first groove 323a may comprise a first first-first groove and first-second groove formed by being recessed from the first lateral surface 321a of the body portion 321 of the first substrate 320 and spaced apart from each other, and a first-third groove and the first-fourth groove formed by being recessed from the second lateral surface 321b of the body portion 321 of the first substrate 320 and spaced apart from each other. The first-first to first-fourth grooves may be symmetrical with respect to the optical axis corresponding to the central axis of the first substrate 320. Meanwhile, the first-first groove and the first-second groove may be arranged adjacent to each other, and the first-third groove and the first-fourth groove may be disposed adjacent to each other. Through this, solder application workability can be improved compared to the present embodiment.

The lens driving device according to the modified embodiment may comprise a first terminal 324a of the first substrate 320. The first terminal 324a may extend from the first groove 323a. The first terminal 324a may extend along the lower surface of the first substrate 320. Although the second terminal 332a of the second substrate 330 is formed on the lower surface of the second substrate 330, and the first terminal 324a of the first substrate 320 is formed on the lower surface of the first substrate 320, thereby having a height difference, the first terminal 324a and the second terminal 332a may be continuously disposed when viewed from the bottom of the first substrate 320. Through this structure, the first terminal 324a and the second terminal 332a may be connected by a first conductive member disposed in the first groove 323a. The first terminal 324a may have a semicircular shape. The first terminal 324a may be formed on the entire circumference of the first groove 323. The first terminal 324a may be formed of a conductive material.

The lens driving device according to the modified embodiment may comprise a second terminal 332a of the second substrate 330. The second terminal 332a may be disposed on the lower surface of the second substrate 330. The second terminal 332a may be connected to the first terminal 324a of the first substrate 320 through a first conductive member. The second terminal 332a may be exposed through the first groove 323a of the first substrate 320.

The lens driving device according to the modified embodiment may comprise a second groove 311a of the base 310. The second groove 311a may be formed on an upper surface of the base 310. The second groove 311a may be formed at a position corresponding to one or more of the first terminal 324a and the second terminal 332a. The second groove 311a may be formed at a position corresponding to the first terminal 324a. The second groove 311a may be formed at a position corresponding to the second terminal 332a. A solder ball connecting the first terminal 324a and the second terminal 332a may be disposed in the second groove 311a. The first terminal 324a of the first substrate 320 and the second terminal 332a of the second substrate 330 are coupled through soldering, and at least a portion of the solder may be disposed in the second groove 311a of the base 310. The second groove 311a may be disposed closer to the outer circumference of the base 310 than the first hole 312 of the base 310. The second groove 311a is disposed adjacent to the outer circumference of the base 310, through which the first protruding portion 316, which is the inner configuration of the base 310, can be used as a mechanical guide when coupling the base 310 and the first substrate 320 and the second substrate 330.

The second groove 311a may be a rectangular groove. The second groove 311a may comprise two grooves. Compared with the present embodiment, in the modified embodiment, it can be considered that two second grooves are formed into a single second groove. Two solders may be accommodated in each of the two second grooves. The second groove 311 may be connected to a second protruding portion 318 forming an outer circumference.

In the lens driving device according to the modified embodiment, a second Hall sensor 721a may be disposed in a diagonal direction of the first substrate 320. Accordingly, the second hole 315a of the base 310 accommodating the second Hall sensor 721a may also be disposed in a diagonal direction of the base 310.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:
1. A lens driving device comprising:
a base;
a housing disposed on the base;
a bobbin disposed in the housing;
a first coil disposed on the bobbin;
a magnet disposed in the housing;
a first substrate disposed on the base;
a second substrate disposed on the first substrate and comprising a second coil;
a conductive member electrically connecting the first substrate and the second substrate;
an upper elastic member coupled with an upper portion of the bobbin and an upper portion of the housing; and
a support member coupled with the upper elastic member and the first substrate,
wherein the first substrate comprises a body portion disposed on an upper surface of the base, an extension portion bent from the body portion, a first groove formed on an outer periphery of the body portion, and a first terminal formed on a lower surface of the first substrate and adjacent to the first groove,
wherein the second substrate comprises a second terminal formed on a lower surface of the second substrate,
wherein the conductive member connects the first terminal of the first substrate and the second terminal of the second substrate,
wherein the body portion of the first substrate comprises first and second lateral surfaces disposed opposite to each other, and third and fourth lateral surfaces disposed opposite to each other,
wherein the extension portion of the first substrate is formed on the third lateral surface and the fourth lateral surface,
wherein the first groove of the first substrate comprises a first-first groove and a first-second groove recessed from the first lateral surface of the body portion of the first substrate,
wherein the first terminal of the first substrate comprises a first-first terminal extending from the first-first groove and a first-second terminal extending from the first-second groove,
wherein the second terminal of the second substrate comprises a second-first terminal disposed at a position corresponding to that of the first-first groove and a second-second terminal disposed at a position corresponding to that of the first-second groove,
wherein the first substrate comprises a third terminal formed on the lower surface of the first substrate and coupled with the support member,
wherein the third terminal of the first substrate comprises a third-first terminal and a third-second terminal, and
wherein, in a direction from the third lateral surface to the fourth lateral surface when viewed from below, the third-first terminal, the second-first terminal, the first-first terminal, the first-second terminal, the second-second terminal and the third-second terminal are disposed in that order.

2. The lens driving device of claim 1, wherein the base comprises a second groove formed on the upper surface of the base and formed at a position corresponding to that of the first terminal.

3. The lens driving device of claim 2, wherein the first terminal of the first substrate and the second terminal of the second substrate are coupled through soldering, and at least a portion of the solder is disposed on the second groove of the base.

4. The lens driving device of claim 3, wherein the bobbin comprises a hole formed on the bobbin in an optical axis direction,
wherein the base comprises a first hole formed on the base at a position corresponding to that of the hole of the bobbin in the optical axis direction, and
wherein the second groove of the base is disposed closer to an outer periphery of the base than is the first hole of the base.

5. The lens driving device of claim 1, wherein the first groove of the first substrate comprises a first-third groove and a first-fourth groove recessed from the second lateral surface of the body portion of the first substrate and spaced apart from each other.

6. The lens driving device of claim 5, wherein the first terminal of the first substrate comprises a first-third terminal extending from the first-third groove, and a first-fourth terminal extending from the first-fourth groove, and
wherein the first-first terminal extends from the first-first groove only toward the first-second groove, the first-second terminal extends from the first-second groove only toward the first-first groove, the first-third terminal extends from the first-third groove only toward the first-fourth groove, and the first-fourth terminal extends from the first-fourth groove only toward the first-third groove.

7. The lens driving device of claim 1, wherein the first groove of the first substrate is recessed from a lateral surface of the body portion of the first substrate to an area in which an inner lateral end of the second terminal of the second substrate is formed.

8. The lens driving device of claim 6, wherein the first terminal of the first substrate extends along the lower surface of the first substrate,
wherein the support member comprises four wires,
wherein the third terminal of the first substrate comprises a third-third terminal and a third-fourth terminal,
wherein the third-first to third-fourth terminals are coupled with the four wires, respectively,
wherein the third-first terminal and the third-second terminal are disposed closer to the first lateral surface than to the second lateral surface of the first substrate, and
wherein the first-first terminal and the first-second terminal are disposed between the third-first terminal and the third-second terminal.

9. The lens driving device of claim 1, comprising:
a cover made of a metal material and comprising an upper plate disposed above the bobbin, and a lateral plate extending from the upper plate and coupled with the base,
wherein the lateral surface of the base comprises a fifth lateral surface, a sixth lateral surface disposed opposite to the fifth lateral surface, and a seventh lateral surface and an eighth lateral surface disposed opposite to each other between the fifth and sixth lateral surfaces,
wherein the base comprises a third groove formed on each of the fifth lateral surface and the sixth lateral surface, and a fourth groove formed on each of the seventh and eighth lateral surfaces,
wherein the extension portion of the first substrate is disposed on the fourth groove of the base,
wherein the first substrate comprises a bent portion extending from each of the first lateral surface and the second lateral surface of the first substrate and disposed on the third groove of the base, and a fourth terminal disposed on an outer surface of the bent portion, and
wherein the fourth terminal of the first substrate is contacted with an inner surface of the lateral plate of the cover.

10. A lens driving device comprising:
a base;
a housing disposed on the base;
a bobbin disposed in the housing;
a first coil disposed on the bobbin;
a magnet disposed in the housing and facing the first coil;
a first substrate comprising a body portion disposed on an upper surface of the base, and an extension portion extending from the body portion and disposed on a lateral surface of the base;
a second substrate comprising a second coil facing the magnet and disposed on an upper surface of the body portion of the first substrate;
an upper elastic member coupled with an upper portion of the bobbin and an upper portion of the housing; and
a support member coupled with the upper elastic member and the body portion of the first substrate,
wherein the second substrate comprises a second terminal disposed on a lower surface of the second substrate,
wherein the first substrate comprises a first groove formed on an outer lateral surface of the body portion of the first substrate and disposed at a position corresponding to the second terminal of the second substrate, and a first terminal extending from the first groove along a lower surface of the first substrate,
wherein the first terminal of the first substrate and the second terminal of the second substrate are connected through a conductive member,
wherein the base comprises a second groove formed on the upper surface of the base,
wherein at least a portion of the conductive member is disposed on the second groove of the base,
wherein the body portion of the first substrate comprises first and second lateral surfaces disposed opposite to each other, and third and fourth lateral surfaces disposed opposite to each other,
wherein the first groove of the first substrate comprises a first-first groove and a first-second groove recessed from the first lateral surface of the body portion of the first substrate,
wherein the first terminal of the first substrate comprises a first-first terminal extending from the first-first groove and a first-second terminal extending from the first-second groove,
wherein the second terminal of the second substrate comprises a second-first terminal disposed at a position corresponding to that of the first-first groove and a second-second terminal disposed at a position corresponding to that of the first-second groove,
wherein the first substrate comprises a third terminal formed on the lower surface of the first substrate and coupled with the support member,
wherein the third terminal of the first substrate comprises a third-first terminal and a third-second terminal, and
wherein, in a direction from the third lateral surface to the fourth lateral surface when viewed from below, the third-first terminal, the second-first terminal, the first-first terminal, the first-second terminal, the second-second terminal and the third-second terminal are disposed in that order.

11. The lens driving device of claim 4, wherein the base comprises a protruding portion protruding from the upper surface of the base along an inner circumferential surface of the first hole of the base, and wherein the protruding portion is inserted into the first substrate and the second substrate.

12. The lens driving device of claim 11, wherein the base comprises a first protrusion outwardly protruding from the first protruding portion,
wherein each of the first substrate and the second substrate comprises a fifth groove comprising a shape corresponding to that of the first protrusion, and
wherein at least a portion of the first protrusion is disposed in the fifth groove.

13. The lens driving device of claim 7, wherein the second substrate comprises a sixth groove recessed from an outer periphery of the second substrate, and
wherein the support member passes through the sixth groove of the second substrate.

14. The lens driving device of claim 4, comprising a Hall sensor sensing the magnet,
wherein the base comprises a second hole spaced apart from the first hole and the second groove of the base, and
wherein at least a portion of the Hall sensor is disposed in the second hole of the base.

15. A camera device comprising:
a printed circuit board;
an image sensor disposed on the printed circuit board;
the lens driving device of claim 1 disposed above the printed circuit board; and
a lens coupled with the bobbin of the lens driving device.

16. An optical apparatus comprising:
a main body;
the camera device of claim 15 disposed on the main body; and
a display disposed on the main body and outputting an image photographed by the camera device.

17. A lens driving device comprising:
a base;
a housing disposed on the base;
a bobbin disposed in the housing;
a first coil and a magnet configured to move the bobbin in an optical axis direction;
a first substrate disposed on the base;
a second coil facing the magnet and disposed on the first substrate;
a conductive member electrically connecting the first substrate and the second coil;
an upper elastic member coupled with an upper portion of the bobbin and an upper portion of the housing; and
a support member coupled with the upper elastic member and the first substrate,
wherein the first substrate comprises a body portion disposed on the base, an extension portion extending from the body portion, a first groove formed on an outer periphery of the body portion, and a first terminal formed on a lower surface of the first substrate and adjacent to the first groove,
wherein the second coil comprises a second terminal formed on a lower surface of the second coil,
wherein the conductive member connects the first terminal of the first substrate and the second terminal of the second coil,
wherein the body portion of the first substrate comprises first and second lateral surfaces disposed opposite to each other, and third and fourth lateral surfaces disposed opposite to each other,
wherein the first groove of the first substrate comprises a first-first groove and a first-second groove recessed from the first lateral surface of the body portion of the first substrate,
wherein the first terminal of the first substrate comprises a first-first terminal extending from the first-first groove and a first-second terminal extending from the first-second groove,
wherein the second terminal of the second coil comprises a second-first terminal disposed at a position corresponding to that of the first-first groove and a second-second terminal disposed at a position corresponding to that of the first-second groove,
wherein the first substrate comprises a third terminal formed on the lower surface of the first substrate and coupled with the support member,
wherein the third terminal of the first substrate comprises a third-first terminal and a third-second terminal, and
wherein, in a direction from the third lateral surface to the fourth lateral surface when viewed from below, the third-first terminal, the second-first terminal, the first-first terminal, the first-second terminal, the second-second terminal and the third-second terminal are disposed in that order.

18. The lens driving device of claim 17, wherein the first groove of the first substrate comprises a first-third groove and a first-fourth groove recessed from the second lateral surface of the body portion of the first substrate and spaced apart from each other.

19. The lens driving device of claim 18,
wherein the first terminal of the first substrate comprises a first-third terminal extending from the first-third groove, and a first-fourth terminal extending from the first-fourth groove, and
wherein the first-first terminal extends from the first-first groove only toward the first-second groove, the first-second terminal extends from the first-second groove only toward the first-first groove, the first-third terminal extends from the first-third groove only toward the first-fourth groove, and the first-fourth terminal extends from the first-fourth groove only toward the first-third groove.

20. The lens driving device of claim 17, wherein the base comprises a second groove formed on an upper surface of the base and formed at a position corresponding to that of the first terminal, and
wherein at least a portion of the conductive member is disposed in the second groove of the base.

* * * * *